United States Patent
Muroyama

(10) Patent No.: US 9,830,100 B2
(45) Date of Patent: Nov. 28, 2017

(54) STORAGE CONTROL DEVICE AND STORAGE CONTROL METHOD

(71) Applicant: FUJITSU LIMITED, Kawasaki-shi (JP)

(72) Inventor: Tomohiko Muroyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 564 days.

(21) Appl. No.: 14/477,227

(22) Filed: Sep. 4, 2014

(65) Prior Publication Data

US 2015/0121001 A1 Apr. 30, 2015

(30) Foreign Application Priority Data

Oct. 24, 2013 (JP) ................................ 2013-221651

(51) Int. Cl.
G06F 12/06 (2006.01)
G06F 12/02 (2006.01)
G06F 3/06 (2006.01)

(52) U.S. Cl.
CPC .......... G06F 3/0634 (2013.01); G06F 3/0619 (2013.01); G06F 3/0689 (2013.01); G06F 12/0646 (2013.01); G06F 2003/0692 (2013.01)

(58) Field of Classification Search
CPC .... G06F 3/0634; G06F 3/0619; G06F 3/0689; G06F 12/0646; G06F 12/0246
USPC ........................................................ 711/114
See application file for complete search history.

(56) References Cited

U.S. PATENT DOCUMENTS

| | | | | |
|---|---|---|---|---|
| 8,549,247 | B2 * | 10/2013 | Satoyama | G06F 3/0608 |
| | | | | 711/114 |
| 9,088,528 | B2 * | 7/2015 | Hara | G06F 3/0605 |
| 2001/0054133 | A1 * | 12/2001 | Murotani | G06F 3/0605 |
| | | | | 711/114 |
| 2005/0119996 | A1 | 6/2005 | Ohata et al. | |

(Continued)

FOREIGN PATENT DOCUMENTS

JP 2001-222380 8/2001
JP 2001-337790 12/2001

(Continued)

OTHER PUBLICATIONS

Japanese Office Action dated Aug. 8, 2017 from Japanese Patent Application No. 2013-221651, 8 pages.

*Primary Examiner* — Pierre-Michel Bataille
(74) *Attorney, Agent, or Firm* — Staas & Halsey LLP

(57) ABSTRACT

A storage control device that is any of a plurality of storage control devices configured to control access to a plurality of storages included in a storage system, includes: a processor; and a memory which stores a plurality of instructions, which when executed by the processor, cause the processor to execute: executing, depending on a first bias for accessing a plurality of storage regions included in the plurality of storages, a first configuration change which corrects the first bias based on configuration information identifying a configuration of the storage system; and executing, depending on a second bias for accessing the plurality of storages, a second configuration change which corrects the second bias based on the configuration information after changing the first configuration, or executing, depending on a third bias for loading the plurality of storage control devices, a third configuration change which corrects the third bias.

15 Claims, 14 Drawing Sheets

| | | LOCATION OF COLLECTION | UNIT OF COLLECTION | PERFORMANCE INFORMATION TO BE COLLECTED |
|---|---|---|---|---|
| 901-1 | CONCENTRATION OF ACCESS TO PLUs | RAID CONTROLLER | PLU | TIME PERIODS IN WHICH PLUs ARE EXECUTED |
| | | | | NUMBERS OF READ COMMANDS AND NUMBERS OF WRITE COMMANDS |
| | | | | NUMBERS OF READ BLOCKS AND NUMBERS OF WRITE BLOCKS |
| 901-2 | CONCENTRATION OF CPU BUSY RATES | OS CONTROLLER | CPU | CPU BUSY RATES (TOTAL CPU TIMES AND IDLE CPU TIMES) |
| 901-3 | CONCENTRATION OF CROSS ACCESS | RESOURCE CONTROLLER | RLU | NUMBERS OF TIMES OF I/O STRAIGHT ACCESS AND NUMBERS OF TIMES OF I/O CROSS ACCESS |
| 901-4 | CONCENTRATION OF ACCESS TO SPECIFIC SLUs | CACHE CONTROLLER | SLU | NUMBERS OF COMMANDS AND NUMBERS OF TIMES OF SEQUENTIAL ACCESS |

(56) References Cited

U.S. PATENT DOCUMENTS

| | | | |
|---|---|---|---|
| 2006/0010290 A1 | 1/2006 | Sasamoto | |
| 2007/0288700 A1* | 12/2007 | Tamura | G06F 3/0605 |
| | | | 711/147 |
| 2008/0215810 A1 | 9/2008 | Yamada et al. | |
| 2012/0278526 A1* | 11/2012 | Cho | G06F 3/061 |
| | | | 711/103 |
| 2014/0156815 A1* | 6/2014 | Kitahara | G06F 3/0605 |
| | | | 709/221 |

FOREIGN PATENT DOCUMENTS

| | | | | |
|---|---|---|---|---|
| JP | 2005-157933 | 6/2005 | | |
| JP | 2006-24024 | 1/2006 | | |
| JP | 2008-46763 | 2/2008 | | |
| JP | 2008-192020 | 8/2008 | | |
| JP | 2009-217700 | 9/2009 | | |
| JP | WO 2014068607 A1 * | 5/2014 | | G06F 3/0605 |
| JP | WO 2015104811 A1 * | 7/2015 | | G06F 9/5016 |

\* cited by examiner

FIG. 9

| | LOCATION OF COLLECTION | UNIT OF COLLECTION | PERFORMANCE INFORMATION TO BE COLLECTED |
|---|---|---|---|
| 901-1 CONCENTRATION OF ACCESS TO PLUs | RAID CONTROLLER | PLU | TIME PERIODS IN WHICH PLUs ARE EXECUTED |
| | | | NUMBERS OF READ COMMANDS AND NUMBERS OF WRITE COMMANDS |
| | | | NUMBERS OF READ BLOCKS AND NUMBERS OF WRITE BLOCKS |
| 901-2 CONCENTRATION OF CPU BUSY RATES | OS CONTROLLER | CPU | CPU BUSY RATES (TOTAL CPU TIMES AND IDLE CPU TIMES) |
| 901-3 CONCENTRATION OF CROSS ACCESS | RESOURCE CONTROLLER | RLU | NUMBERS OF TIMES OF I/O STRAIGHT ACCESS AND NUMBERS OF TIMES OF I/O CROSS ACCESS |
| 901-4 CONCENTRATION OF ACCESS TO SPECIFIC SLUs | CACHE CONTROLLER | SLU | NUMBERS OF COMMANDS AND NUMBERS OF TIMES OF SEQUENTIAL ACCESS |

| | CAUSE OF REDUCTION IN PERFORMANCE | DEGREE OF EFFECT | AFFECTED RANGE | OPTIMIZATION METHOD | OPERATION |
|---|---|---|---|---|---|
| 1001-1 | CONCENTRATION OF ACCESS TO PLUs | LARGE | SPECIFIC VOLUMES | ADD PLU TO RAID GROUP | NOTIFY ADMINISTRATOR |
| 1001-2 | CONCENTRATION OF CPU BUSY RATES | LARGE | OVERALL CMs | MIGRATE PLU TO RAID GROUP HAVING DIFFERENT RAID CONFIGURATION | NO OPERATION |
| 1001-3 | CONCENTRATION OF CROSS ACCESS | MIDDLE | SPECIFIC VOLUMES | CHANGE CPU RESPONSIBLE FOR ACCESS TO RAID GROUP | NO OPERATION |
| 1001-4 | CONCENTRATION OF ACCESS TO SPECIFIC SLUs | MIDDLE | SPECIFIC VOLUMES | CHANGE CPU RESPONSIBLE FOR ACCESS TO RAID GROUP | NO OPERATION |
| | | | | MIGRATE PLU TO RAID GROUP HAVING DIFFERENT RAID CONFIGURATION | NO OPERATION |

1001

STORAGE CONTROL DEVICE AND STORAGE CONTROL METHOD

CROSS-REFERENCE TO RELATED APPLICATION

This application is based upon and claims the benefit of priority of the prior Japanese Patent Application No. 2013-221651, filed on Oct. 24, 2013, the entire contents of which are incorporated herein by reference.

FIELD

The embodiment discussed herein is related to a storage control device, a storage control method, and a program.

BACKGROUND

Traditionally, there is a technique for changing a configuration of a storage system including a plurality of storage sections. For example, when access is concentrated on any of the plurality of storage sections, the access concentrated on the storage section is distributed by changing the configuration of the storage system in some cases. In addition, for example, when a load is concentrated on any of a plurality of processors configured to control the plurality of storage sections, the load concentrated on the processor is distributed by changing the configuration of the storage system in some cases.

For example, Japanese Laid-open Patent Publication No. 2005-157933 discloses a technique for automatically adjusting, based on performance information collected from a storage network element to be monitored, a target range of information to be collected after the collection of the performance information or the amount of the information to be collected. In addition, Japanese Laid-open Patent Publication No. 2009-217700 discloses a technique for generating, based on statistical information representing the frequency of access from a host device to a physical extent assigned to a first logical disk, a copy volume of a first logical disk on a second physical extent assigned to a second logical disk. In addition, Japanese Laid-open Patent Publication No. 2001-337790 discloses a technique for causing an external manager to communicate with a group of disk array control devices, collect and manage access information on physical drives included in the disk array control devices and logical volumes included in the disk array control devices and configuration information on the physical drives and the logical volumes, and generate an optimal instruction to migrate data in order to equalize access loads. Furthermore, Japanese Laid-open Patent Publication No. 2001-222380 discloses a technique for causing a host device to estimate times for the execution of commands for a hard disk device based on parameter information received from the hard disk drive and rearrange the commands based on results of the estimation.

SUMMARY

According to an aspect of the embodiments, a storage control device that is any of a plurality of storage control devices configured to control access to a plurality of storages included in a storage system, includes: a processor; and a memory which stores a plurality of instructions, which when executed by the processor, cause the processor to execute: executing, depending on a first bias for accessing a plurality of storage regions included in the plurality of storages, a first configuration change which corrects the first bias based on configuration information identifying a configuration of the storage system; and executing, depending on a second bias for accessing the plurality of storages, a second configuration change which corrects the second bias based on the configuration information after changing the first configuration, or executing, depending on a third bias for loading the plurality of storage control devices, a third configuration change which corrects the third bias based on the configuration information after changing the first configuration.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 9 is a diagram illustrating a list of performance information to be used for detection;

FIG. 10 is a diagram describing an example of degrees of effects of concentration on performance and methods for optimizing a RAID configuration;

DESCRIPTION OF EMBODIMENT

Hereinafter, an embodiment of a storage control device disclosed herein, a control method disclosed herein, and a program disclosed herein is described in detail with reference to the accompanying drawings.

Figure 1:
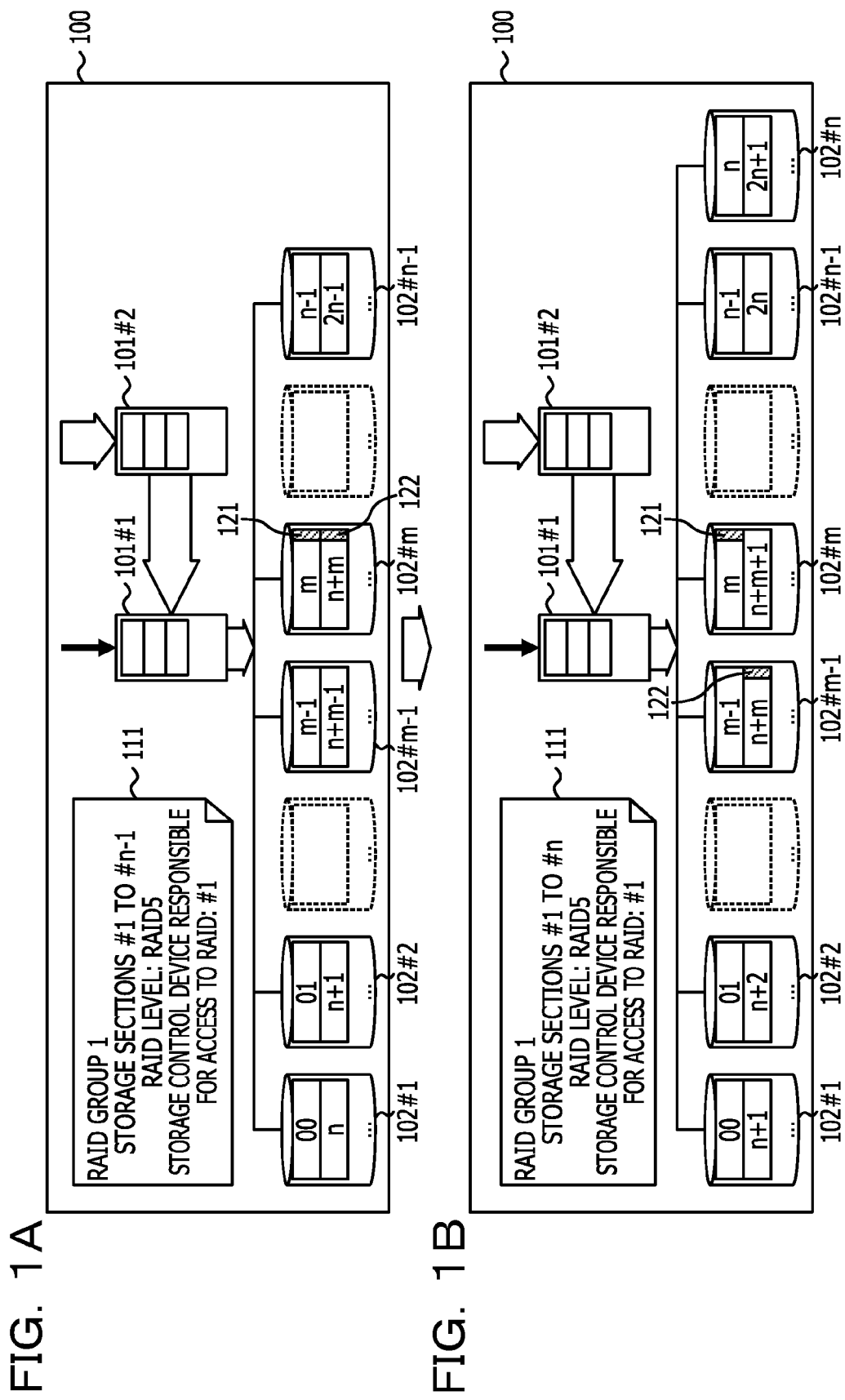
FIGS. 1A and 1B are diagrams describing an example of operations of storage control devices according to an embodiment.

FIGS. 1A and 1B are diagrams describing an example of operations of storage control devices according to the embodiment. A storage system 100 according to the embodiment includes a plurality of storage control devices 101#1 and 101#2 configured to control storage sections 102#1 to 102#n.

The storage system 100 is configured to provide storage regions of the storage sections 102#1 to 102#n to a user of the storage system 100. In order to avoid losing data of the user, the storage control devices 101#1 and 101#2 combine the storage sections 102#1 to 102#n so as to cause the storage sections 102#1 to 102#n to form redundant arrays of inexpensive disks (RAIDs) and provide virtual volumes formed by the RAIDs to the user. The storage system 100 stores configuration information 111 that identifies a configuration of the storage system 100. The configuration information 111 includes information of the RAID groups formed by combining the storage sections 102#1 to 102#n.

The information of the RAID groups includes information identifying RAID configurations and information identifying storage control devices 101 responsible for access to the RAID groups. The RAID configurations are determined based on RAID levels and the numbers of storage sections 102. RAID groups that have the same RAID configuration have the same RAID level and include the same number of disks. A plurality of RAID levels are defined and are RAID0 to RAID6. There are also RAID levels that are RAID0+1 and the like and each obtained by combining a plurality of RAID levels.

A technique for distributing data to a plurality of storage sections 102 and speeding up input and output (I/O) operations is referred to as striping. Data items are arranged in order on an X-byte basis in volumes forming RAID groups. The data items of X bytes are referred to as strips. In addition, a data set formed by horizontally synthesizing strips arranged in storage sections 102 forming a RAID group is referred to as a stripe.

If a RAID level of a RAID group in which data is to be written is RAID5, a storage control device 101 responsible for access to the RAID group calculates a parity from the data to be written and writes the data or the parity in an interested strip.

The storage system 100 forms RAIDs and may thereby provide, to the user, reliable storage regions with data redundancy. In addition, since access is distributed to a plurality of storage sections 102 by the formation of the RAIDs, the storage system 100 may provide, to the user, storage regions that enable a high-speed response to access.

However, when access is concentrated on a single storage section 102 among a plurality of storage sections 102 forming a RAID group, input and output (I/O) performance of the RAID group depends on I/O of the single storage section 102 and a response to the access is delayed. In addition, when access is concentrated on a single storage region among the plurality of storage regions included in the plurality of storage sections 102, a response to the access is delayed. Furthermore, when a load is concentrated on a single storage control device 101 among the plurality of storage control devices 101, a response to access is delayed.

As an example in which access is concentrated on a single storage section 102, metadata that is managed by a file system, application software, or the like and has a relatively small file size may be read and written at certain times. Access may be concentrated on data stored in the single storage section 102 due to the number of storage sections 102 forming a RAID group and the size of each strip, depending on a characteristic of access to the metadata.

Specifically, for example, it is assumed that metadata managed by application software or the like has a table structure with a plurality of records and the size of each of the records matches a data size of a single strip. In addition, it is assumed that the application software executes a process of searching, from the plurality of records, records in which values of a certain field satisfy a certain requirement. In this case, a storage region in which the field of the records is stored may be concentrated on a single storage section 102 among a plurality of storage sections 102 forming a RAID group.

A response delay may be solved by changing a configuration of the storage system 100. However, an advanced knowledge may be requested for tuning to be performed in order to enable sufficient performance of the storage system 100, and a load on an administrator of the storage system 100 may be high. Specifically, the administrator of the storage system 100 may seek the cause of the inhibition of the sufficient performance of the storage system 100 and research performance information collected from the inside of the storage system 100 in the tuning for enabling sufficient performance of the storage system 100.

In addition, it is assumed that the configuration of the storage system 100 is changed in order to solve the concentration of access to a single storage section 102, the concentration of access to a single storage region, or the concentration of a load on a single storage control device 101. In this case, the concentration other than the solved concentration may be increased by the configuration of the storage system 100. Then, if an effect of the increased concentration on the performance of the storage system 100 is larger than an effect of the solved concentration on the performance of the storage system 100, the performance of the storage system 100 is reduced.

The storage control devices 101 according to the embodiment correct the concentration of access to a plurality of storage regions of a plurality of storage sections 102 and correct the concentration of access to a plurality of storage sections 102 or the concentration of a load on a plurality of storage control devices 101 after the correction of the concentration of the access to the plurality of storage regions. Thus, the storage control devices 101 inhibit the accuracy of correction causing a high effect on the performance of the storage system 100 from being reduced by correction causing a low effect on the performance of the storage system 100.

FIG. 1A illustrates a state after any of the storage control devices 101#1 and 101#2 makes, depending on whether or not access is concentrated on a plurality of storage regions included in a plurality of storage sections 102, a first configuration change so as to correct the concentration of the access to the plurality of storage regions based on the configuration information 111. Any of the storage control devices 101#1 and 101#2 corrects the concentration of the access to the plurality of storage regions by making the first configuration change. The first configuration change made to correct the concentration of the access to the plurality of storage regions is described later with reference to FIGS. 10 and 11.

The configuration information 111 illustrated in FIG. 1A indicates that a RAID group 1 is formed of the storage sections 102#1 to #n−1 and a RAID level of the RAID group 1 is RAID5. In addition, the configuration information 111 illustrated in FIG. 1A indicates that the storage control device 101#1 is responsible for access to the RAID group 1. Arrows that are illustrated in FIGS. 1A and 1B and point at the storage control devices 101#1 and 101#2 indicate amounts of access to the RAID group 1. FIG. 1A indicates that the amount of access requested to be executed by the storage control device 101#2 to the RAID group 1 is larger than the amount of access requested to be executed by the storage control device 101#1 to the RAID group 1. As a result, the storage control device 101#1 executes the directly requested access to the RAID group 1 and access requested by the storage control device 101#2 to the RAID group 1, and a load is thereby concentrated on the storage control device 101#1.

In the storage system 100 illustrated in FIG. 1A, access is concentrated on the storage section 102#m. Rectangles 121 and 122 hatched in FIGS. 1A and 1B represent that corresponding strips are accessed. Specifically, in FIG. 1A, since the rectangle 121 is included in a strip m, the strip m is accessed. In addition, in FIG. 1A, since the rectangle 122 is included in a strip n+m, the strip n+m is accessed. In this manner, as a result of the correction of the concentration of access to a plurality of storage regions, access may be concentrated on a single storage section 102.

After the first configuration change, any of the storage control devices 101#1 and 101#2 makes a second configuration change so as to execute a correction process based on the configuration information 111, depending on whether or not access is concentrated on a plurality of storage sections. Alternatively, after the first configuration change, any of the storage control devices 101#1 and 101#2 makes a third configuration change so as to execute a correction process based on the configuration information 111, depending on whether or not a load is concentrated on a plurality of storage control devices 101.

The second configuration change is made so as to correct the concentration of the access to the plurality of storage sections. Any of the storage control devices 101#1 and 101#2 corrects the concentration of the access to the plurality of storage sections by making the second configuration change. The second configuration change is described later with reference to FIGS. 10 and 11.

In addition, the third configuration change is made to correct the concentration of the load on the plurality of storage control devices 101. Any of the storage control devices 101#1 and 101#2 corrects the concentration of the load on the plurality of storage control devices 101 by making the third configuration change. The third configuration change is described later with reference to FIGS. 10 and 12.

FIG. 1B illustrates an example in which the storage system 100 makes the second configuration change. In the configuration information 111 illustrated in FIG. 1B, the RAID level of the RAID group 1 and the storage control device 101 responsible for access to the RAID group 1 are not changed and the number of storage sections included in the RAID group 1 is changed. Since the storage section 102#n is added to the RAID group 1, the access is distributed to the storage section 102#m having the strip m and the storage section 102#n+m having the strip n+m. Thus, the access concentrated on the storage section 102#m in the state illustrated in FIG. 1A is distributed and the performance of the RAID group 1 is improved.

Any of the storage control devices 101#1 and 101#2 may make the third configuration change so as to execute the correction process after the first configuration change, although this operation is not illustrated in FIGS. 1A and 1B. As the third configuration change, any of the storage control devices 101#1 and 101#2 changes the storage control device 101 responsible for access to the RAID group from the storage control device 101#1 to the storage control device 101#2. Since the amount of access requested to be executed by the storage control device 101#1 to the RAID group 1 is small, a load may be distributed to the storage control devices 101#1 and 101#2 and the performance of the storage system 100 may be improved.

Next, a storage system 200 that includes controller modules (CMs) is described with reference to FIGS. 2 to 14.

Figure 2:
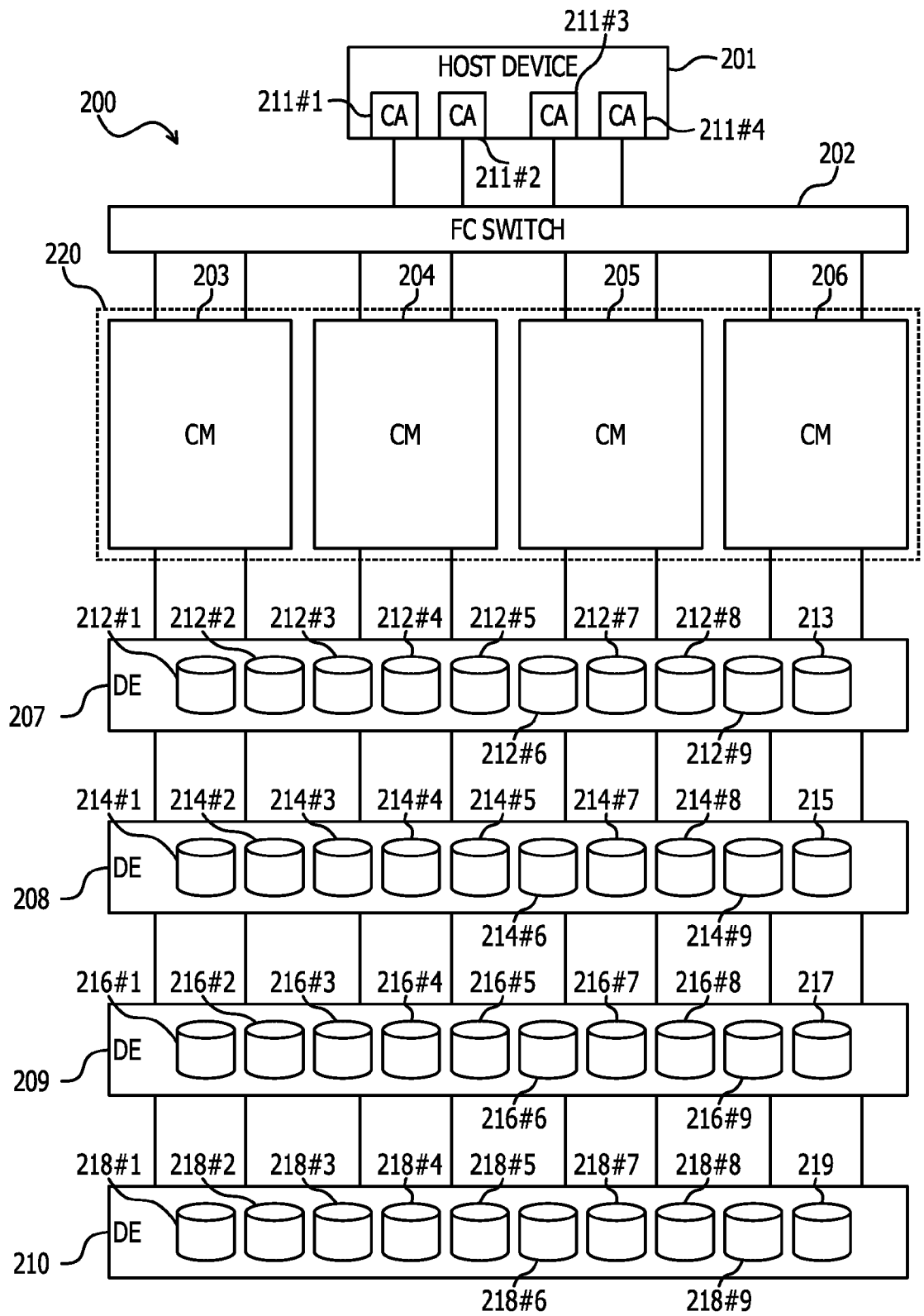
FIG. 2 is a diagram illustrating an example of connections of a storage system.

FIG. 2 is a diagram illustrating an example of connections of the storage system. The storage system 200 includes a host device 201, an FC switch 202, the CMs 203 to 206, and drive enclosures (DEs) 207 to 210. The storage control devices 101 correspond to the CMs 203 to 206.

The host device 201 includes channel adapters (CAs) 211#1 to 211#4. Hardware configurations of the CMs 203 to 206 are described later with reference to FIG. 3. The DE 207 includes storage sections 212#1 to 212#9 and a hot spare (HS) 213. The DE 208 includes storage sections 214#1 to 214#9 and an HS 215. The DE 209 includes storage sections 216#1 to 216#9 and an HS 207. The DE 210 includes storage sections 218#1 to 218#9 and an HS 219.

The host device 201 uses storage regions included in the storage sections 212#1 to 212#9, 214#1 to 214#9, 216#1 to 216#9, and 218#1 to 218#9. The FC switch 202 is a device connecting the host device 201 to the CMs 203 to 206. The CMs 203 to 206 are devices configured to control the storage sections 212#1 to 212#9, 214#1 to 214#9, 216#1 to 216#9, and 218#1 to 218#9. The DEs 207 to 210 are chassis housing the storage sections 212#1 to 212#9, 214#1 to 214#9, 216#1 to 216#9, and 218#1 to 218#9. The storage sections 212#1 to 212#9, 214#1 to 214#9, 216#1 to 216#9, and 218#1 to 218#9 are devices including the storage regions. The CMs 203 to 206 are included in a controller enclosure (CE) 220. The CE 220 is a chassis housing the CMs 203 to 206.

The CAs 211#1 to 211#4 are adapters connected to the CMs 203 to 206 through the FC switch 202. The storage sections 212#1 to 212#9, 214#1 to 214#9, 216#1 to 216#9, and 218#1 to 218#9 are hard disk drives, magnetic tape drives, or the like. The HSs 213, 215, 217, and 219 are devices each having a storage region and serve as auxiliary devices for the storage sections 212#1 to 212#9, 214#1 to 214#9, 216#1 to 216#9, and 218#1 to 218#9.

Figure 3:
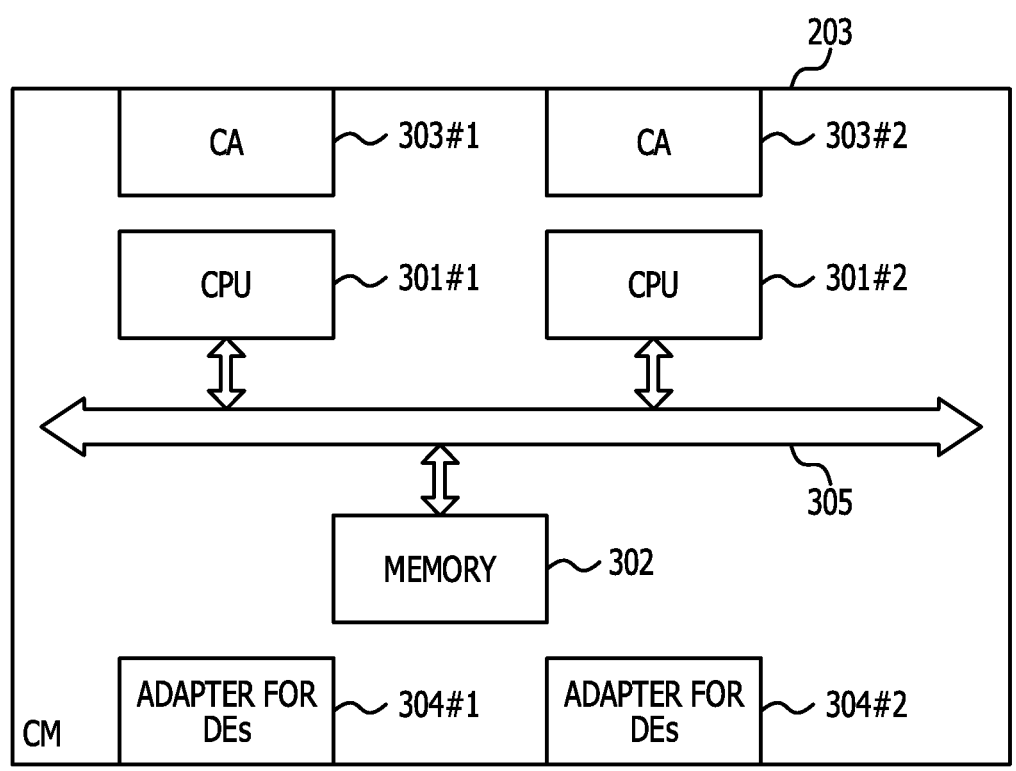
FIG. 3 is a block diagram illustrating an example of a hardware configuration of a controller module.

FIG. 3 is a block diagram illustrating an example of the hardware configuration of the CM. FIG. 3 illustrates the example of the hardware configuration of the CM 203. The hardware configurations of the CMs 204 to 206 are the same as the hardware configuration of the CM 203, and a description thereof is omitted.

The CM 203 includes CPUs 301#1 and 301#2, a memory 302, CAs 303#1 and 303#2, and adapters 304#1 and 304#2 for the DEs. The CPUs 301#1 and 301#2 are connected to the memory 302 through a bus 305. The CAs 303#1 and 303#2 and the adapters 304#1 and 304#2 for the DEs may be connected to the bus 305 or may be connected directly to the CPUs 301#1 and 301#2.

The CPUs 301#1 and 301#2 are arithmetic processing devices configured to control the overall CM 203. The memory 302 is a nonvolatile memory storing programs such as a boot program. The CAs 303#1 and 303#2 are devices connected to the host device 201 through the FC switch 202. The adapters 304#1 and 304#2 for the DEs are devices connected to the storage sections 212#1 to 212#9, 214#1 to 214#9, 216#1 to 216#9, and 218#1 to 218#9 included in the DEs 207 to 210. The CM 203 has a nonvolatile memory storing programs such as the boot program, although the nonvolatile memory is not illustrated in FIG. 3.

As illustrated in FIG. 3, the CMs 203 to 206 each have a plurality of the CPUs. Thus, devices that are each composed of one of the CPUs included in each of the CMs 203 to 206 and the memory 302 included in each of the CMs 203 to 206 may correspond to the storage control devices 101 illustrated in FIG. 1.

Figure 4:
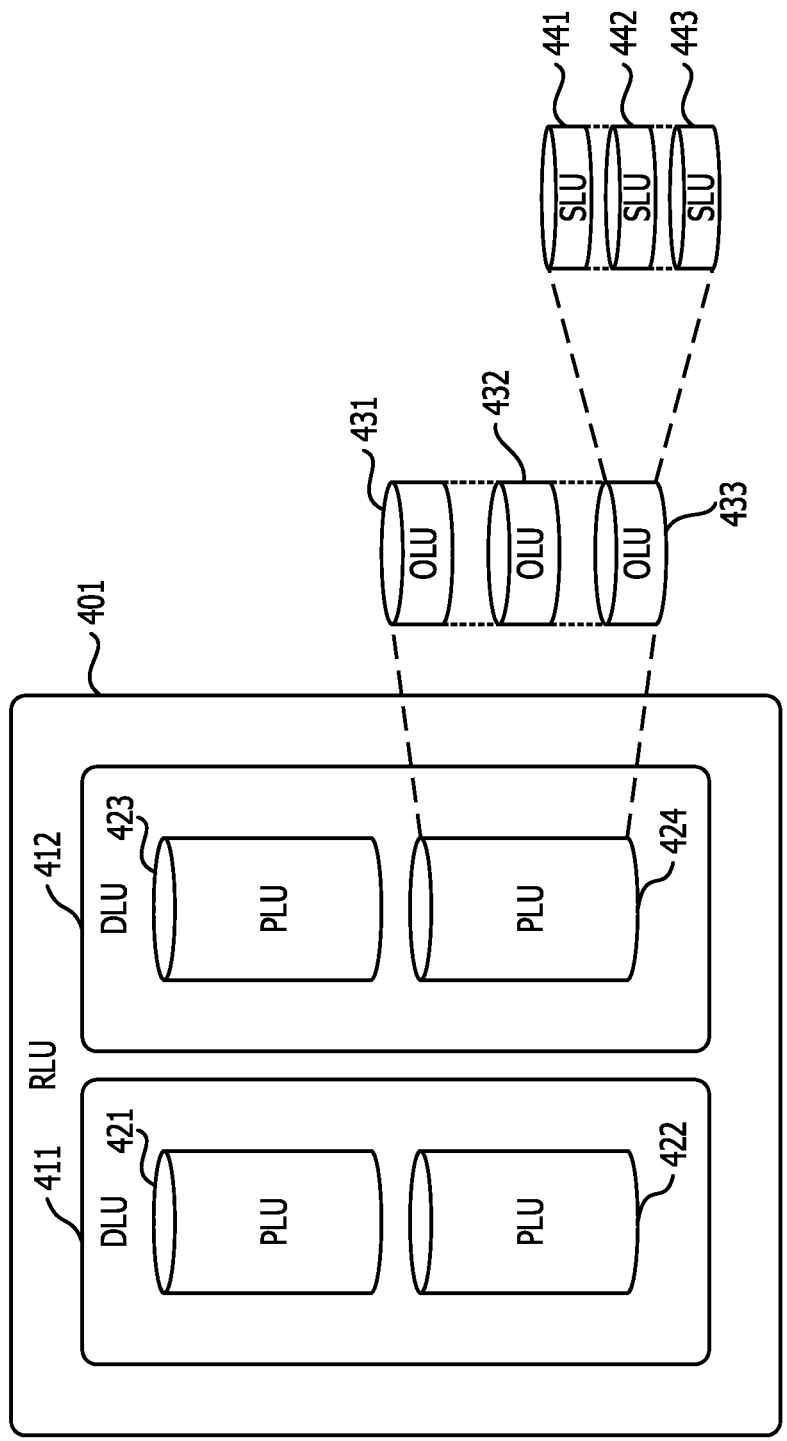
FIG. 4 is a diagram describing relationships between volumes in a RAID configuration.

FIG. 4 is a diagram describing relationships between volumes in a RAID configuration. FIG. 4 describes a RAID group logical unit (RLU), shared logical units (SLUs), open logical units (OLUs), virtual device logical units (DLUs), and physical logical units (PLUs).

The RLU indicates a RAID group. The SLUs indicate volumes of a part of the RAID group or volumes of the overall RAID group. The SLUs indicate minimum units for management of the volumes in the storage system 200. The OLUs indicate open system volumes. Examples of a volume type of the OLUs are a normal volume, a thin provisioning volume (TPV), a flexible tier volume (FTV), and a wide striping volume (WSV) described later with reference to FIG. 6. The DLUs indicate virtual disks. The DLUs are conceptual units configured to associate the RLU with the PLUs. The PLUs indicate physical disks.

FIG. 4 illustrates the disks and volumes of RAID1+0. The RLU 401 has the four PLUs, and the RAID level of the RLU 401 is RAID1+0. The RLU 401 includes the DLUs 411 and 412. The DLU 411 includes PLUs 421 and 422. The DLU 412 includes PLUs 423 and 424. The PLU 424 includes OLUs 431, 432, and 433. The OLU 433 includes SLUs 441, 442, and 443. Regarding the OLUs and the SLUs, a storage region of the OLU indicates storage regions of the SLUs in the first definition of the OLUs. If the storage region of the OLU is to be expanded after the definition of the OLU, the storage region of the OLU may be expanded by redefining the OLU using an existing OLU and other SLUs.

Figure 5:
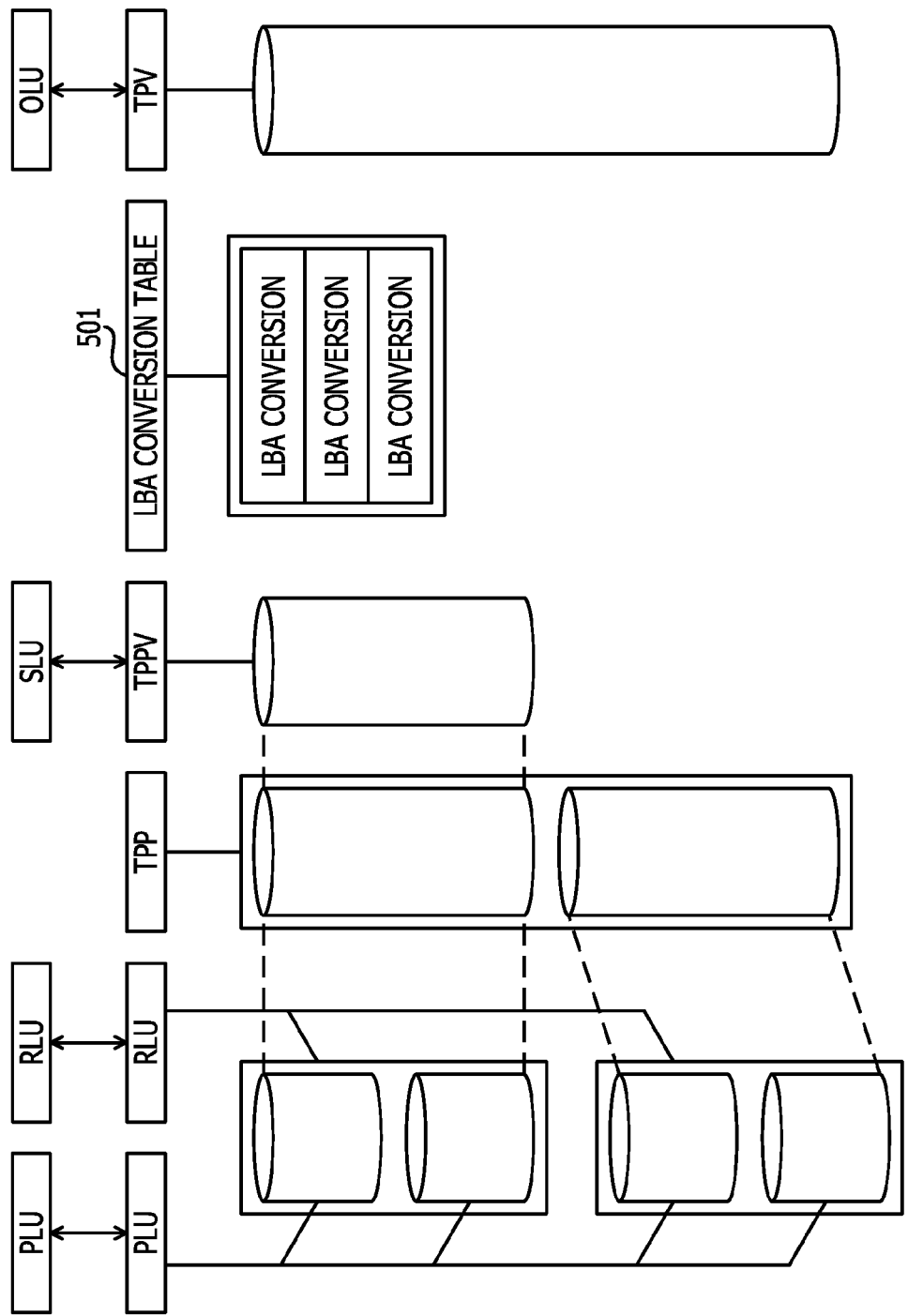
FIG. 5 is a diagram describing correspondence relationships between volumes of thin provisioning.

FIG. 5 is a diagram describing correspondence relationships between volumes of thin provisioning. FIG. 5 describes correspondence relationships between disks and volumes when thin provisioning is not applied and disks and volumes when thin provisioning is applied. Conceptual disks and conceptual volumes when thin provisioning is applied are a thin provisioning pool (TPP), thin provisioning pool volumes (TPPVs), and TPV.

The TPP is a set of RAID groups. The TPPVs are physical volumes for thin provisioning. The TPPVs corresponds to the SLUs. TPVs are logical volumes for thin provisioning. The TPVs correspond to the OLUs. An LBA conversion table 501 is information to be managed in the CM 203.

Figure 6:
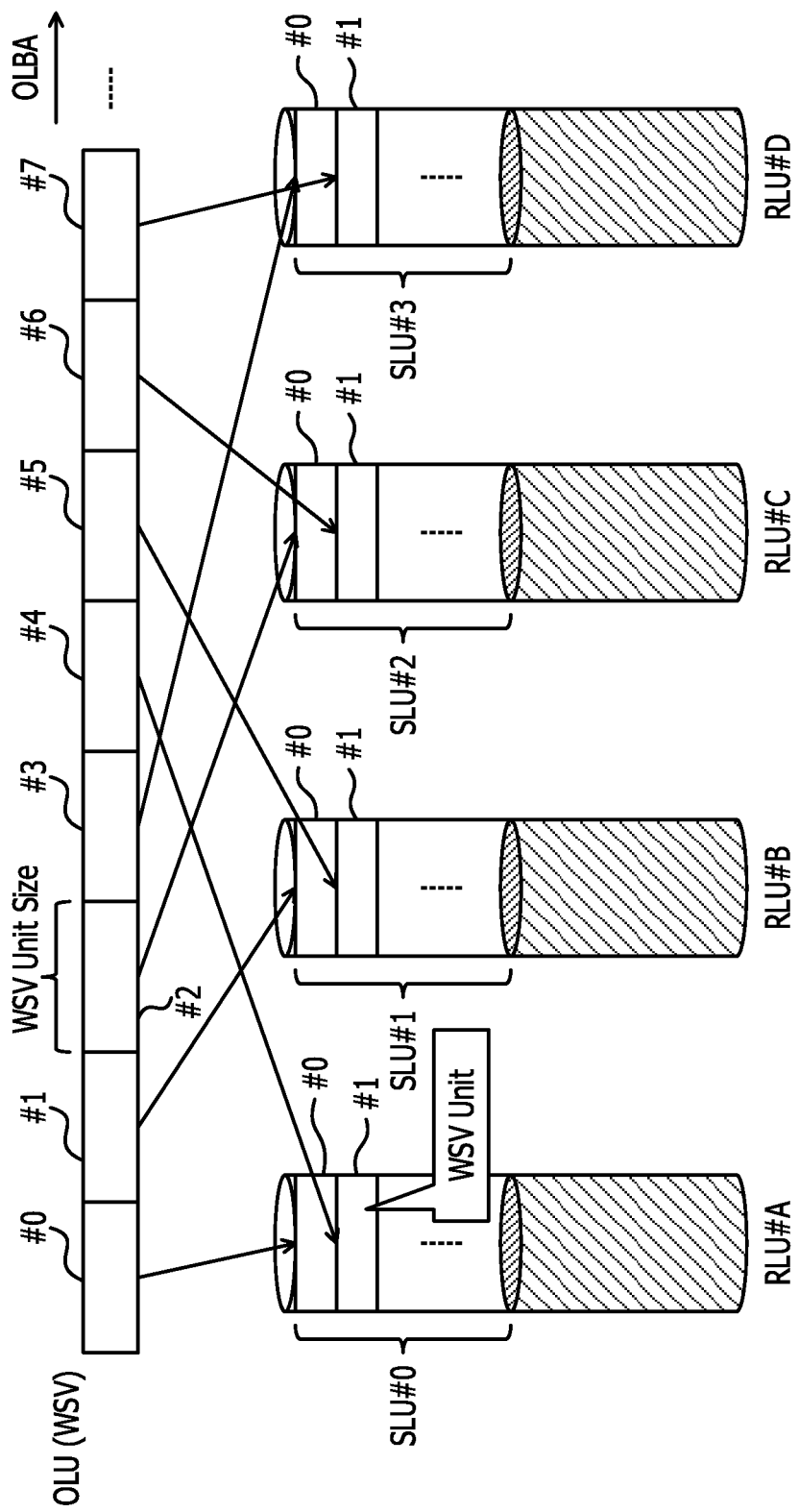
FIG. 6 is a diagram describing wide striping.

FIG. 6 is a diagram describing wide striping. The performance of a RAID significantly depends on the performance of disks. Especially, the performance of random writing is largely affected by the performance of the disks. Thus, if LUNs are numbers of a RAID configuration in which a plurality of disks may be simultaneously used, the performance is improved in general. Wide striping is a function of coupling a plurality of RAID groups by striping in order to improve the performance.

Volumes that are formed by wide striping are referred to as WSVs. SLUs with the same capacity are formed in each of the RAID groups. Each of the SLUs is divided for each of the sizes of coupled WSVs. The divided units are referred to as "WSV units". The sizes of the divided SLUs are referred to as "WSV unit sizes".

OLBAs of the WSVs are assigned to the WSV units of the SLUs by Round-robin in order of the RAID groups on a WSV unit size basis. In the example illustrated in FIG. 6, an SLU #0 is included in an RLU #A, an SLU #1 is included in an RLU #B, an SLU #2 is included in an RLU #C, and an SLU #3 is included in an RLU #D. An OLBA #0 is assigned to a WSV unit #0 within the SLU #0. Next, an OLBA #1 is assigned to a WSV unit #0 within the SLU #1. Subsequently, an OLBA #2 is assigned to a WSV unit #0 within the SLU #2. Then, an OLBA #3 is assigned to a WSV unit #0 within the SLU #3. Then, an OLBA #4 is assigned to a WSV unit #1 within the SLU #0. In this manner, the storage regions of the SLUs are assigned as storage regions of the OLUs.

Figure 7:
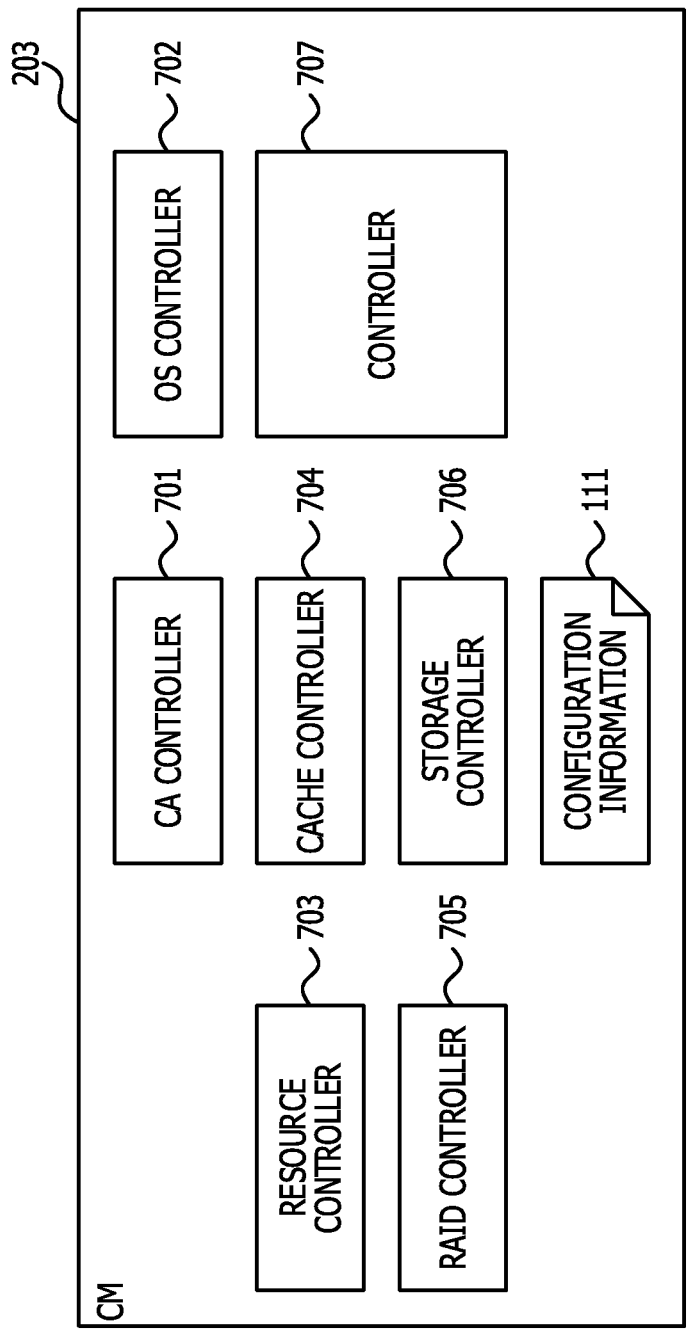
FIG. 7 is a diagram illustrating an example of a functional configuration of the controller module.

FIG. 7 is a diagram illustrating an example of a functional configuration of the CM. The CM 203 includes a CA controller 701, an OS controller 702, a resource controller 703, a cache controller 704, a RAID controller 705, a storage controller 706, and a controller 707. The controllers 701 to 706 are included in each of the CMs 204 to 206. The controller 707 may be included in any of the CMs 204 to 206. The embodiment assumes that the CM 203 is an operation CM configured to the overall storage system 200.

The CM 203 may access the configuration information 111. The configuration information 111 is stored in the memory 302. Functions of the controllers 701 to 707 are achieved by causing the CPU 301#1 to execute a program stored in a memory device and to be used to manage the configuration of the storage system. The memory device is, for example, the memory 302 illustrated in FIG. 3 or the like. Results output from the controllers 701 to 707 are stored in the memory 302.

The CA controller 701 receives a command from the host device 201 and responds to the command. The OS controller 702 controls an OS of the CM 203. The resource controller 703 executes exclusive control on input from the host device 201 and output to the host device 201 and monitors the host device 201. The cache controller 704 monitors a cache region of the memory 302. The RAID controller 705 controls a plurality of RAID groups formed of the storage sections 212#1 to 212#9, 214#1 to 214#9, 216#1 to 216#9, and 218#1 to 218#9. The storage controller 706 controls writing in the storage sections 212#1 to 212#9, 214#1 to 214#9, 216#1 to 216#9, and 218#1 to 218#9.

The controller 707 changes the configuration of the storage system 200. Specifically, the controller 707 changes configurations of the RAID groups and CPUs responsible for access to the RAID groups based on the configuration information 111 and performance information collected from the controllers 701 to 706. An example of a detailed functional configuration of the controller 707 is described below with reference to FIG. 8.

Figure 8:
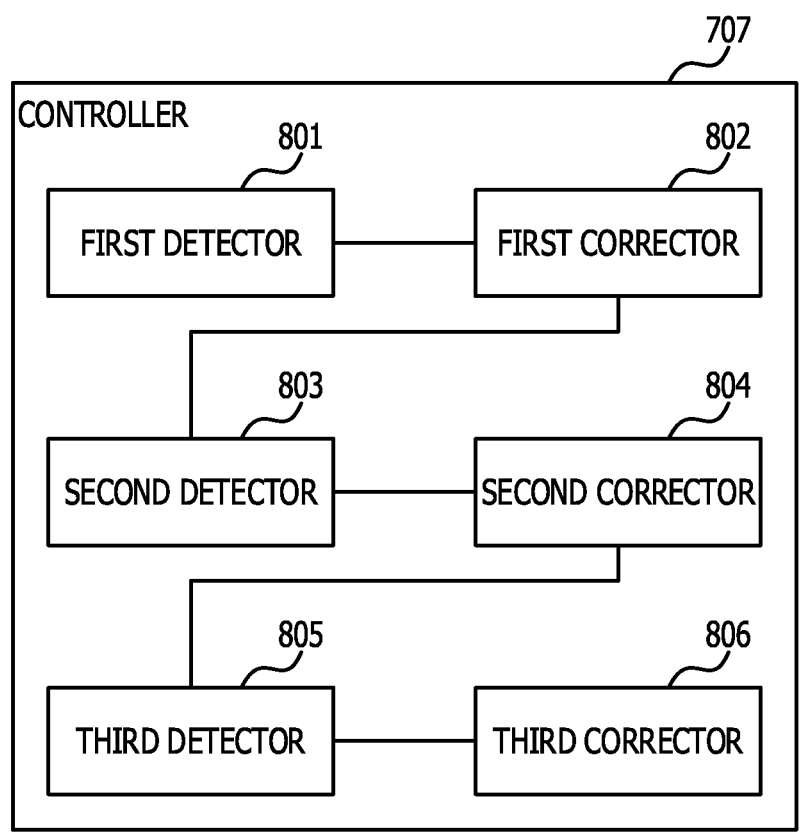
FIG. 8 is a diagram illustrating an example of a detailed functional configuration of a controller.

FIG. 8 is a diagram illustrating the example of the detailed functional configuration of the controller. The controller 707 includes a first detector 801, a first corrector 802, a second detector 803, a second corrector 804, a third detector 805, and a third corrector 806.

The first detector 801 detects whether or not access is concentrated on a plurality of storage regions included in a plurality of storage sections. The plurality of storage sections are a plurality of PLUs. The plurality of storage regions are a plurality of SLUs. Hereinafter, the concentration of access to a plurality of storage regions is referred to as "the concentration of access to specific SLUs". Performance information to be used to detect whether or not access is concentrated on specific SLUs is described later with reference to FIG. 9.

If the first detector 801 detects that access is concentrated on specific SLUs, the first corrector 802 makes the first configuration change so as to correct the concentration of the access to the specific SLUs based on the configuration information in response to the detection by the first detector 801. For example, the first corrector 802 changes, as the first configuration change, a RAID level of a RAID group including an SLU relatively frequently accessed among the plurality of SLUs. Alternatively, the first corrector 802 changes the number of storage sections forming the aforementioned RAID group. An example of the correction of the concentration of the access to the specific SLUs is described later with reference to FIG. 11.

After the first corrector 802 makes the first configuration change, the second detector 803 detects whether or not access is concentrated on a plurality of storage sections. Hereinafter, the concentration of access to a plurality of storage sections is referred to as "the concentration of access to PLUs". Performance information to be used to detect the concentration of access to PLUs is described later with reference to FIG. 9.

If the second detector 803 detects that access is concentrated on PLUs, the second corrector 804 makes the second configuration change so as to correct the concentration of the access to the PLUs based on the configuration information in response to the detect by the second detector 803. For example, the second corrector 804 changes, as the second configuration change, a RAID level of a RAID group including a PLU relatively frequently accessed among the plurality of PLUs, based on the configuration information. Alternatively, the second corrector 804 changes the number of storage sections forming the aforementioned RAID group. An example of the correction of the concentration of the access to the PLUs is described later with reference to FIG. 11.

After the first corrector 802 makes the first configuration change, the third detector 805 detects whether or not a load is concentrated on a plurality of CPUs. Examples of the concentration of the load on the plurality of CPUs are the concentration of cross access and the concentration of CPU busy rates.

The cross access is described below. CPUs are responsible for access to the plurality of RAID groups, respectively. If a certain CPU receives access to a certain RAID group and is not a CPU responsible for access to the certain RAID group, the certain CPU requests the CPU responsible for access to the certain RAID group to access the certain RAID group. If the certain CPU receives access to the certain RAID group and is the CPU responsible for access to the certain RAID group, the certain CPU accesses the certain RAID group.

Access requested to be executed by a CPU responsible for access to a RAID group is referred to as "cross access". On the other hand, if a CPU that receives access is a CPU responsible for access to a RAID group, the access to be executed by the responsible CPU is referred to as "straight access". The responsible CPU is referred to as a "RAID responsible CPU" in some cases.

After the first configuration change, the third detector 805 detects whether or not cross access is concentrated or whether or not CPU busy rates are concentrated. Performance information to be used to detect whether or not the cross access is concentrated, and performance information to be used to detect whether or not the CPU busy rates are concentrated, are described later with reference to FIG. 9.

If the third detector 805 detects that the cross access is concentrated or that the CPU busy rates are concentrated, the third corrector 806 makes the third configuration change based on the configuration information in response to the detection by the third detector 805. For example, if the third detector 805 detects that the cross access is concentrated, the third corrector 806 makes the third configuration change so as to correct the concentration of the cross access in response to the detection by the third detector 805.

In addition, for example, if the third detector 805 detects that the CPU busy rates are concentrated, the third corrector 806 makes the third configuration change so as to correct the concentration of the CPU busy rates in response to the detection by the third detector 805. An example of the correction of the concentration of the cross access is described later with reference to FIG. 12. An example of the correction of the concentration of the CPU busy rates is described later after the description of FIG. 12. The first configuration change, the second configuration change, and the third configuration change are collectively referred to as a correction process.

FIG. 9 is a diagram illustrating a list of the performance information to be used for the detection. In the embodiment, the performance information of the storage system 200 is to be analyzed and is performance information described in a table 901. The CM 203 uses the performance information described in the table 901 to detect concentration of the following first to fourth types.

In order to detect the concentration of the first type, the CM 203 determines whether or not access is concentrated on PLUs as represented by a record 901-1. Performance information to be collected in order to detect the configuration of the first type is collected by the RAID controller 705 and includes, for each of the PLUs, information of a period of time when the PLU is executed, the number of read commands, the number of write commands, the number of read blocks, and the number of write blocks. The performance information to be collected in order to detect the concentration of the first type is collected for each of the PLUs.

The CM 203 detects, based on the numbers of the commands or the numbers of the blocks, whether or not the access is concentrated on the PLUs. The CM 203 uses the following expression (9-1-1) to calculate the number of read commands that is used for the detection.

$$\text{The number of the read commands that is used for the detection} = \text{the number of the read commands} - \text{the number of read commands provided during the previous collection} \quad (9\text{-}1\text{-}1)$$

In addition, the CM 203 uses the following expression (9-1-2) to calculate the number of write commands that is used for the detection.

$$\text{The number of the write commands that is used for the detection} = \text{the number of the write commands} - \text{the number of write commands provided during the previous collection} \quad (9\text{-}1\text{-}2)$$

In addition, the CM 203 uses the following expression (9-1-3) to calculate the number of read blocks that is used for the detection.

$$\text{The number of the read blocks that is used for the detection} = \text{the number of the read blocks} - \text{number of read blocks used during the previous collection} \quad (9\text{-}1\text{-}3)$$

In addition, the CM 203 uses the following expression (9-1-4) to calculate the number of write blocks that is used for the detection.

$$\text{The number of the write blocks that is used for the detection} = \text{the number of the write blocks} - \text{number of write blocks used during the previous collection} \quad (9\text{-}1\text{-}4)$$

If the CM 203 determines, based on the numbers of commands, whether or not access is concentrated on PLUs, and only one certain PLU that satisfies the following expression (9-1-5) exists, the CM 203 determines that the access is concentrated on the PLUs.

$$\text{The number of commands for the certain PLU} > \text{a predetermined threshold } 1A \times \text{the number of commands for another PLU} \quad (9\text{-}1\text{-}5)$$

In expression (9-1-5), the number of commands is a sum of the number of read commands that is used for the detection and the number of write commands that is used for the detection. Alternatively, the number of the commands may be a sum of a value obtained by multiplying the number of the read commands that is used for the detection by a weight and a value obtained by multiplying the number of the write commands that is used for the detection by a weight. The predetermined threshold 1A is a value specified by an administrator of the storage system 200. For example, the predetermined threshold 1A is 5.

If the CM 203 determines, based on the numbers of blocks, whether or not access is concentrated on PLUs, and only one certain PLU that satisfies the following expression (9-1-6) exists, the CM 203 determines that the access is concentrated on the PLUs.

> The number of blocks of the certain PLU>a predetermined threshold 1B×the number of blocks of another PLU (9-1-6)

In expression (9-1-6), the number of blocks is a sum of the number of read blocks that is used for the detection and the number of write blocks that is used for the detection. Alternatively, the number of the blocks may be a sum of a value obtained by multiplying the number of the read blocks that is used for the detection by a weight and a value obtained by multiplying the number of the write blocks that is used for the detection by a weight. The predetermined threshold 1B is a value specified by the administrator of the storage system 200. For example, the predetermined threshold 1B is 5. The CM 203 may use the predetermined threshold 1A to determine, based on the numbers of the blocks, whether or not the access is concentrated on the PLUs, instead of using the predetermined threshold 1B.

In order to detect the concentration of the second type, the CM 203 determines whether or not CPU busy rates are concentrated as represented by a record 901-2. Performance information to be collected in order to detect the concentration of the second type is collected by the OS controller 702 and includes, for each of the CPU busy rates, information of a total time period (total CPU time) in which an interested CPU operates and a time period (idle CPU time) in which the interested CPU is idle. The total CPU time and the idle CPU time are included in each of the CPU busy rates. The performance information to be collected in order to detect the concentration of the second type is collected for each of the CPUs. Specifically, the CM 203 uses the following expression (9-2-1) to calculate each of the CPU busy rates to be used for the detection.

> The CPU busy rate to be used for the detection=
> ((the total CPU time−a total CPU time during the previous collection)−(the idle CPU time−an idle CPU time during the previous collection)/
> (the total CPU time−the total CPU time during the previous collection)×100 (9-2-1)

If only one certain CPU that satisfies the following expression (9-2-2) exists, the CM 203 determines that CPU busy rates are concentrated.

> A CPU busy rate of the certain CPU that is used for the detection>a predetermined threshold 2×a CPU busy rate of another CPU that is used for the detection (9-2-2)

The predetermined threshold 2 is a value specified by the administrator of the storage system 200. For example, the predetermined threshold 2 is 5.

In order to detect the concentration of the third type, the CM 203 determines whether or not cross access is concentrated as represented by a record 901-3. Performance information to be used in order to detect the concentration of the third type is collected by the resource controller 703 and includes the number of times of I/O straight access and the number of times of I/O cross access. The performance information to be collected in order to detect the concentration of the third type is collected for each of RLUs. Specifically, the CM 203 uses the following expression (9-3-1) to calculate the number of times of the straight access to be used for the detection.

> The number of the times of the straight access to be used for the detection=the number of times of I/O straight access−the number of times of I/O straight access during the previous collection (9-3-1)

The CM 203 uses the following expression (9-3-2) to calculate the number of times of the cross access to be used for the detection.

> The number of the times of the cross access to be used for the detection=the number of times of I/O cross access−the number of times of I/O cross access during the previous collection (9-3-2)

If a certain RAID group satisfies the following expression (9-3-3), the CM 203 determines that cross access is concentrated on the certain RAID group.

> The number of times of cross access to the certain RAID group>the number of times of straight access to the certain RAID group (9-3-3)

In order to detect the concentration of the fourth type, the CM 203 determines whether or not access is concentrated on specific SLUs as represented by a record 901-4. Performance information to be used in order to detect the concentration of the fourth type is collected by the cache controller 704 and includes the number of commands and the number of times of sequential access for each of the SLUs. The performance information to be used in order to detect the concentration of the fourth type is collected for each of the SLUs. Specifically, the CM 203 uses the following expression (9-4-1) to calculate the number of read commands that is used for the detection.

> The number of the read commands that is used for the detection=the number of read commands−the number of read commands provided during the previous collection (9-4-1)

In addition, the CM 203 uses the following expression (9-4-2) to calculate the number of write commands that is used for the detection.

> The number of the write commands that is used for the detection=the number of write commands−the number of write commands provided during the previous collection (9-4-2)

In addition, the CM 203 uses the following expression (9-4-3) to calculate the number of sequential access read commands that is used for the detection.

> The number of the sequential access read commands that is used for the detection=the number of sequential access read commands−the number of sequential access read commands provided during the previous collection (9-4-3)

In addition, the CM 203 uses the following expression (9-4-4) to calculate the number of sequential access write commands that is used for the detection.

> The number of the sequential access write commands that is used for the detection=the number of sequential access write commands−the number of sequential access write commands provided during the previous collection (9-4-4)

In addition, the CM 203 uses the following expression (9-4-5) to calculate the number of random access read commands that is used for the detection.

The number of the random access read commands that is used for the detection=(the number of the read commands−the number of the read commands provided during the previous collection)−(the number of the sequential access read commands−the number of the sequential access read commands provided during the previous collection) (9-4-5)

In addition, the CM 203 uses the following expression (9-4-6) to calculate the number of random access write commands that is used for the detection.

The number of the random access write commands that is used for the detection=(the number of the write commands−the number of the write commands provided during the previous collection)−(the number of the sequential access write commands−the number of the sequential access write commands provided during the previous collection) (9-4-6)

If only one certain SLU that is among a group of SLUs included in a certain OLU and satisfies the following Inequities (9-4-7), (9-4-8), and (9-4-9) exists, the CM 203 determines that access is concentrated on the SLU. Then, the CM 203 determines whether or not access is concentrated on specific SLUs for each OLU.

The number of commands for the certain SLU>a predetermined threshold 4A×the number of commands for another SLU (9-4-7)

The number of sequential commands for the certain SLU>a predetermined threshold 4B×the number of sequential commands for the other SLU (9-4-8)

The number of random commands for the certain SLU>a predetermined threshold 4C×the number of random commands for the other SLU (9-4-9)

The number of commands for an SLU is a sum of the number of read commands that is used for the detection and the number of write commands that is used for the detection. Similarly, the number of sequential commands for the SLU is a sum of the number of sequential access read commands that is used for the detection and the number of sequential access write commands that is used for the detection. In addition, the number of the random commands for the SLU is a sum of the number of random access read commands that is used for the detection and the number of random access write commands that is used for the detection. The predetermined thresholds 4A to 4C are values specified by the administrator of the storage system 200.

If SLUs that satisfy all Inequities (9-4-7), (9-4-8), and (9-4-9) exist, the CM 203 determines that access is concentrated on the specific SLUs. In addition, if only one SLU that satisfies at least one of Inequities (9-4-7), (9-4-8), and (9-4-9) exists, the CM 203 may determine that access is concentrated on specific SLUs.

FIG. 10 is a diagram describing an example of degrees of effects of concentration on performance and methods for optimizing a RAID configuration. A table 1001 indicates degrees of effects of the concentration (described with reference to FIG. 9) of the four types on the performance. Among the degrees of the effects on the performance, a degree of an effect of the concentration of access to PLUs is largest and a degree of an effect of the concentration of access to specific SLUs is smallest.

The reason why the degree of the effect of the concentration of access to PLUs on the performance of the storage system 200 is largest is that although a RAID achieves a high speed of a response to access by distributing the access to a plurality of storage sections, a single PLU on which the access is concentrated may be a bottleneck and may inhibit the RAID from achieving the high speed of the response to the access.

The reason why the degree of the effect of the concentration of access to specific SLUs on the performance of the storage system 200 is smallest is described. As the reason, the RAID has a plurality of distributed storage sections, and if access is concentrated on a single storage region, the concentration has less effect on the high speed achieved by the RAID than other concentration.

The concentration of access to PLUs is represented by a record 1001-1 and has the highest effect on the performance, and an affected range is specific volumes. The CM 203 makes the second configuration change so as to correct the concentration of the access to the PLUs.

As a method for optimizing the correction of the concentration of access to PLUs, there are a first method for adding another PLU to the RAID group and a second method for migrating OLUs included in the PLUs to another RAID group having a different RAID configuration. The CM 203 may select any of the first and second methods. If the CM 203 selects the second method and access is still concentrated on the PLUs after the selection, the CM 203 may select the first method.

If the CM 203 selects the first method, the CM 203 notifies the administrator of the storage system 200 of a request to add a storage section corresponding to the PLU. For example, if the HS 213 exists in the storage system 200, the CM 203 sets the HS 213 as the storage region to be added to the RAID group and provides, to the administrator, a notification requesting the addition of the new HS. Even if the HS 213 exists in the storage system 200, the CM 203 may provide, to the administrator, a notification requesting the addition of another storage section to the RAID group. If the CM 203 selects the second method, the CM 203 does not provide a notification to the administrator of the storage system 200.

The concentration of CPU busy rates is represented by a record 1001-2 and has the second highest effect on the performance after the concentration of access to PLUs, and an affected range is the overall CMs 203 to 206. The CM 203 executes the process included in the third configuration change so as to correct the concentration of the CPU busy rates.

As a method for optimizing the correction of the concentration of the CPU busy rates, there is a method for changing a CPU responsible for access to the RAID group. If the CPU responsible for access to the RAID group is changed, the CM 203 does not provide a notification to the administrator of the storage system 200.

The concentration of cross access is represented by a record 1001-3 and has the third highest effect on the performance after the concentration of CPU busy rates, and an affected range is specific volumes. The CM 203 executes the process included in the third configuration change so as to correct the concentration of the cross access.

As a method for optimizing the correction of the concentration of the cross access, there is a method for changing a CPU responsible for access to the RAID group. If the CPU responsible for access to the RAID group is changed, the CM 203 does not provide a notification to the administrator of the storage system 200.

The concentration of access to specific SLUs is represented by a record 1001-4 and has the fourth highest effect on the performance after the concentration of the cross access, and an affected range is specific volumes. The CM 203 makes the first configuration change so as to correct the concentration of the access to the specific SLUs.

As a method for optimizing the correction of the concentration of the access to the specific SLUs, there is a method for migrating, to a RAID group having a different RAID configuration, an OLU to which the specific SLU belong. When the migration is executed, the CM 203 does not provide a notification to the administrator of the storage system 200.

The correction of the concentration of access to PLUs and the correction of the concentration of access to specific SLUs are described with reference to FIG. 11, and the correction of the concentration of cross access is described with reference to FIG. 12. The correction of the concentration of CPU busy rates is described after the description of the correction of the concentration of cross access.

Figure 11:
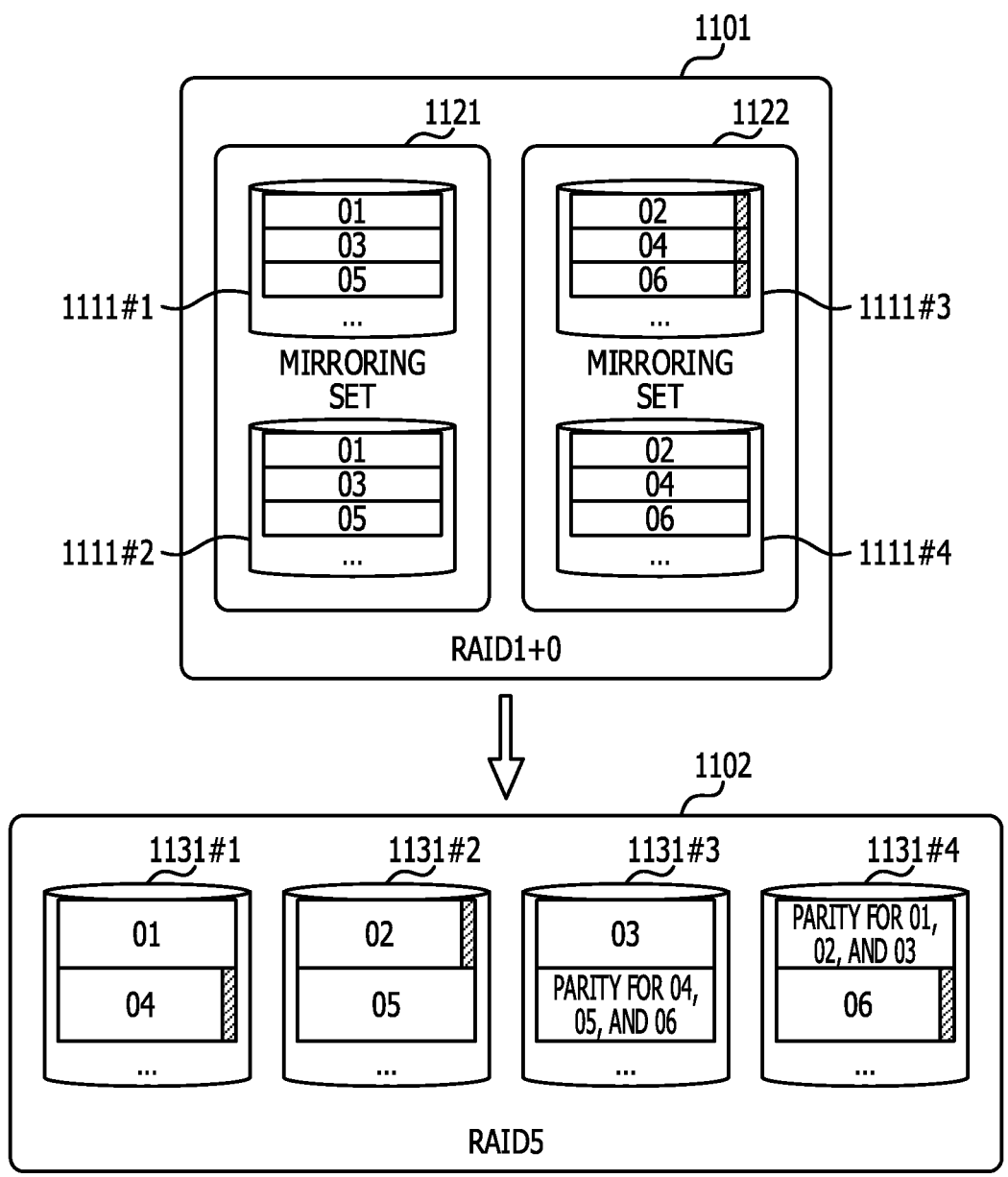
FIG. 11 is a diagram describing an example of the correction of the concentration of access to physical logical units and the correction of the concentration of access to specific shared logical units.

FIG. 11 is a diagram describing an example of the correction of the concentration of access to PLUs and the correction of the concentration of access to specific SLUs.

Correction of Concentration of Access to PLUs

As the correction of the concentration of access to PLUs, there are a first method for adding a PLU to the RAID group and a second method for migrating OLUs included in the PLUs to a RAID group having a different RAID configuration. If the CM 203 selects the first method and uses expression (9-1-5) or (9-1-6) to detect that access is concentrated on the PLUs, the CM 203 adds a PLU to a RAID group that includes the PLUs satisfying expression (9-1-5) or (9-1-6). The CM 203 references the configuration information 111 and identifies the RAID group that includes the PLUs satisfying expression (9-1-5) or (9-1-6).

If the CM 203 selects the second method and uses expression (9-1-5) or (9-1-6) to detect that access is concentrated on the PLUs, the CM 203 sets, as OLUs to be migrated, OLUs included in the PLUs satisfying expression (9-1-5) or (9-1-6). Then, the CM 203 reassigns the OLUs to an RLU having a RAID configuration different from an RLU within a pool to which the OLUs to be migrated belongs. The CM 203 copies a TPP element (TPPE) forming a TPPV. After the completion of the copy, the CM 203 updates the LBA conversion table 501, rewrites a table after the copy over a table forming the OLUs and causes information before the copy to be invalid. The CM 203 references the configuration information 111 and identifies a RAID configuration of the RLU within the pool to which the OLUs to be migrated belongs.

Correction of Concentration of Access to Specific SLUs

If the CM 203 uses any of Inequities (9-4-7), (9-4-8), and (9-4-9) to detect that access is concentrated on specific SLUs, the CM 203 sets, as an OLU to be migrated, an OLU to which the specific SLUs belong. Subsequent processes are the same as the processes to be executed when the second method is selected for the correction of the concentration of access to PLUs, and a description thereof is omitted.

The example illustrated in FIG. 11 describes the migration of an OLU included in a RAID group 1101 to a RAID group 1102 as an example of the aforementioned migration. The RAID group 1101 is formed of storage sections 1111#1 to 1111#4, and a RAID level of the RAID group 1101 is RAID1+0. The storage sections 1111#1 to 1111#4 are among the storage sections 212#1 to 212#9, 214#1 to 214#9, 216#1 to 216#9, and 218#1 to 218#9. In the RAID group 1101, the storage sections 1111#1 and 1111#2 form a mirroring set 1121, and the storage sections 1111#3 and 1111#3 form a mirroring set 1122. Specifically, the storage sections 1111#1 and 1111#2 have strips 01, 03, 05, . . . of the OLU to be migrated. The storage sections 1111#3 and 1111#4 have strips 02, 04, 06, . . . of the OLU to be migrated.

It is assumed that access is concentrated on the storage section 1111#3 having the strips 02, 04, 06, . . . , due to a characteristic of data and the CM 203 detects the concentration of the access to PLUs and migrates the OLU (to be migrated) to the RAID group 1102.

The RAID group 1102 is formed of storage sections 1131#1 to 1131#4, and a RAID level of the RAID group 1102 is RAID5. After the OLU is migrated, the storage 1131#1 has the strips 01, 04, . . . of the migrated OLU. After the OLU is migrated, the storage 1131#2 has the strips 02, 05, . . . of the migrated OLU. After the OLU is migrated, the storage 1131#3 has the strip 03 of the migrated OLU, a parity for the strips 04 to 06 of the migrated OLU, . . . . After the OLU is migrated, the storage 1131#4 has a parity for the strips 01 to 03 of the migrated OLU, the strip 06 of the migrated OLU, . . . .

After the migration of the OLU, the strips 02, 04, and 06 are distributed to the storage sections 1131#1, 1131#2, and 1131#4, and the migrated OLU may improve the performance.

Correction of Concentration of Cross Access

Figure 12:
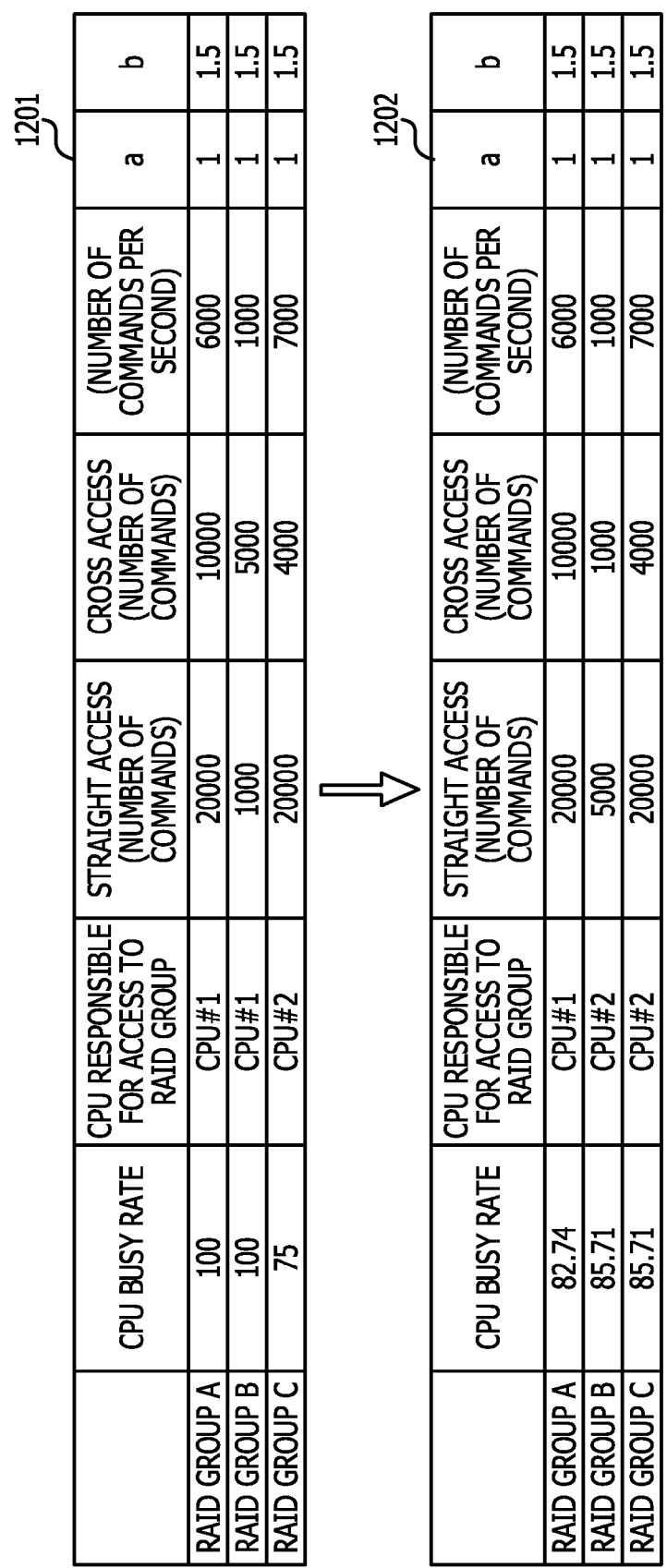
FIG. 12 is a diagram describing an example of the correction of the concentration of cross access.

FIG. 12 is a diagram describing an example of the correction of the concentration of cross access. In order to correct the concentration of cross access, the CM 203 uses the following expression (12-1) to calculate a CPU busy rate for IOPS. The CPU busy rate is used in order to correct the concentration of the cross access.

The CPU busy rate for IOPS=A CPU busy rate/(the number of IOPS that is weighted by straight access and cross access to an RLU for which an interested CPU is responsible)     (12-1)

The CPU busy rate is a rate set to the CPU that is responsible for access to the interested RAID group. The CM 203 references the configuration information 111 and thereby identifies the CPU responsible for access to the interested RAID group. The CM 203 uses the following expression (12-2) to calculate the number of IOPS that is weighted by straight access and cross access to the RLU for which the interested CPU is responsible.

The number of IOPS that is weighted by the straight access and cross access to the RLU for which the CPU is responsible=$a$×the number of times of straight access/(the number of the times of the straight access+the number of times of cross access)×a sum of IOPS for the RLU+$b$×the number of the times of the cross access/(the number of the times of the straight access+the number of the times of the cross access)×the sum of the IOPS for the RLU     (12-2)

Symbols a and b represent coefficients specified by the administrator of the storage system 200. The number of the times of the straight access is the number, used in expression (9-3-3), of the times of the straight access to the RAID group, while the number of the times of the cross access is the number, used in expression (9-3-3), of the times of the cross access to the RAID group.

The CM 203 uses the following expressions (12-3) and (12-4) to calculate the sum of the IOPS for the RLU.

The number of read IOPS=(the number of read commands−the number of read commands provided during the previous collection)/a time interval at which performance information is collected     (12-3)

The number of write IOPS=(the number of write commands−the number of write commands provided during the previous collection)/the time interval at which the performance information is collected     (12-4)

expressions (12-3) and (12-4) are expressions for calculating the number of read IOPS on an SLU basis and calculating the number of write IOPS on an SLU basis. Thus, the CM 203 uses expressions (12-3) and (12-4) to calculate the number of read IOPS and the number of write IOPS for each of SLUs included in the RLU. A sum of the calculated numbers of the read IOPS and the calculated numbers of the write IOPS is treated as the sum of the IOPS for the RLU.

It is assumed that the CM 203 changes a CPU responsible for access to a RAID group so as to optimize an access method. Based on this assumption, the CM 203 uses the following expression (12-5) to calculate a CPU busy rate after the change of the CPU responsible for access to the RAID group. Hereinafter, a state after the CPU responsible for access to the RAID group is assumed to be changed is referred to as a state "after the assumed change".

The CPU busy rate after the assumed change=a CPU busy rate for IOPS×the number of IOPS that is weighted by straight access and cross access to the RLU after the assumed change     (12-5)

The CM 203 uses the following expression (12-6) to calculate the number of IOPS that is weighted by the straight access and cross access to the RLU after the assumed change.

The number of IOPS that is weighted by the straight access and cross access to the RLU after the assumed change=$a$×the number of times of the straight access after the assumed change/(the number of the times of the straight access after the assumed change+the number of times of the cross access after the assumed change)×the sum of the IOPS for the RLU+$b$×the number of the times of the cross access after the assumed change/(the number of the times of the straight access after the assumed change+the number of the times of the cross access after the assumed change)×the sum of the IOPS for the RLU     (12-6)

The CM 203 determines whether or not the difference between the maximum CPU busy rate after the assumed change and the minimum CPU busy rate after the assumed change is equal to or larger than a certain threshold. If the CM 203 determines that the difference is equal to or larger than the certain threshold, the CM 203 assigns, to a CPU of which the CPU busy rate is the minimum rate, a CPU of which the CPU busy rate is the maximum rate and that is responsible for access to a RAID group and assigned as a responsible CPU to the RAID group. In the selection of an RLU targeted for a change of assignment, when the CM 203 changes the assignment of a CPU responsible for access to the RLU, the CPU 203 calculates a CPU busy rate for each of RLUs and selects the RLU that is targeted for the change of the assignment and for which the calculated CPU busy rate is closest to a half of the certain threshold. Then, the CM 203 repeats this operation until the difference between the maximum CPU busy rate after the assumed change and the minimum CPU busy rate after the assumed change becomes equal to or smaller than the certain threshold.

FIG. 12 describes an example in which the storage system 200 uses a configuration with the CM 203 and CPUs #1 and #2 to correct cross access. A Table 1201 indicates performance information before the correction. The CM 203 uses expression (12-2) to calculate the number of IOPS that is weighted by straight access and cross access to RLUs for which the CPU #1 is responsible and to calculate the number of IOPS that is weighted by straight access and cross access to an RLU for which the CPU #2 is responsible. According to the Table 1201, the CPU #1 is responsible for access to RAID groups A and B, and the CPU #2 is responsible for access to a RAID group C.

The CM 203 uses expression (12-2) to calculate the number of IOPS that is weighted by straight access and cross access to the RAID groups A and B for which the CPU #1 is responsible.

The number of IOPS that is weighted by the straight access and cross access to the RAID groups $A$ and $B$=$a$×the number of times of straight access to the RAID groups $A$ and $B$/(the number of the times of the straight access to the RAID groups $A$ and $B$+the number of times of cross access to the RAID groups $A$ and $B$)×a sum of IOPSs for the RAID groups $A$ and $B$+$b$×the number of the times of the cross access to the RAID groups $A$ and $B$/(the number of the times of the straight access to the RAID groups $A$ and $B$+the number of the times of the cross access to the RAID groups $A$ and $B$)×the sum of the IOPSs for the RAID groups $A$ and $B$ According to the Table 1201, the number of the IOPS that is weighted by the straight access and cross access to the RAID groups $A$ and $B$=1×(20000+1000)/((20000+1000)+(10000+5000))×(6000+1000)+1.5×(10000+5000)/((20000+1000)+(10000+5000))×(6000+1000)=21000/36000×7000+1.5×15000/36000×7000=8458.3

Then, the CM 203 uses expression (12-1) to calculate a CPU busy rate of the CPU #1 for IOPS.

The CPU busy rate of the CPU #1 for IOPS=100/8458.3=0.01182

Similarly, the CM 203 uses expression (12-2) to calculate the number of IOPS that is weighted by straight access and cross access to the RAID group C for which the CPU #2 is responsible.

The number of IOPS that is weighted by the straight access and cross access to the RAID group $C$=$a$×the number of times of the straight access to the RAID group $C$/(the number of the times of the straight access to the RAID group $C$+the number of times of the cross access to the RAID group $C$)×a sum of IOPS for the RAID group $C$+$b$×the number of the times of the cross access to the RAID group $C$/(the number of the times of the straight access to the RAID group $C$+the number of the times of the cross access to the RAID group $C$)×the sum of the IOPS for the RAID group $C$ According to the Table 1201, the number of the IOPS that is weighted by the straight access and cross access to the RAID group $C$=1×20000/(20000+4000)×7000+1.5×4000/(20000+4000)×7000=20000/24000×7000+1.5×4000/24000×7000=7583.3

Then, the CM 203 uses expression (12-1) to calculate a CPU busy rate of the CPU #2 for IOPS.

The CPU busy rate of the CPU #2 for IOPS=75/7583.3=0.00989

A table 1202 is performance information obtained if the CPU responsible for access to the RAID group B is changed from the CPU #1 to the CPU #2. The CM 203 uses expression (12-6) to calculate the number of IOPS that is weighted by straight access and cross access to the RLU after the assumed change.

The CM 203 uses expression (12-6) to calculate the number of IOPS that is weighted by straight access and cross access to the RAID group A that is in a state after the assumed change and for which the CPU #1 is responsible after the assumed change as follows.

> The number of IOPS that is weighted by the straight access and cross access to the RAID group $A$ after the assumed change=1×20000/(20000+ 10000)×6000+1.5×10000/(20000+10000)× 6000=20000/30000×6000+1.5×10000/30000× 6000=7000

Then, the CM 203 uses expression (12-5) to calculate a CPU busy rate of the CPU #1 for IOPS after the assumed change as follows.

> The CPU busy rate of the CPU #1 for IOPS after the assumed change=A CPU busy rate of the CPU #1 for IOPS×the number of IOPS that is weighted by straight access and cross access to the RAID group $A$ after the assumed change=0.01182×7000=82.74

Similarly, the CM 203 uses expression (12-6) to calculate the number of IOPS that is weighted by straight access and cross access to the RAID groups B and C that are in states after the assumed change and for which the CPU #1 is responsible after the assumed change as follows.

> The number of IOPS that is weighted by the straight access and cross access to the RAID groups $B$ and $C$ after the assumed change=1×(5000+ 20000)/((5000+20000)+(1000+4000))×(1000+ 7000)+1.5×(1000+4000)/((5000+20000)+(1000+ 4000))×(1000+7000)=25000/30000×8000+1.5× 5000/30000×8000=8666.7

Then, the CM 203 uses expression (12-5) to calculate a CPU busy rate of the CPU #2 for IOPS after the assumed change as follows.

> The CPU busy rate of the CPU #2 for IOPS after the assumed change=A CPU busy rate of the CPU #2 for IOPS×the number of IOPS that is weighted by the straight access and cross access to the RAID groups $B$ and $C$ after the assumed change=0.00989×8666.7=85.71

Since the CPU busy rates for IOPS after the assumed change become almost equal to each other, the CM 203 changes the CPU responsible for access to the RAID group B from the CPU #1 to the CPU #2.

Correction of Concentration of CPU Busy Rate

In order to correct the concentration of a CPU busy rate, the CM 203 determines whether or not the difference between the maximum CPU busy rate and the minimum CPU busy rate is equal to or larger than the certain threshold. If the CM 203 determines that the difference is equal to or larger than the certain threshold, the CM 203 assigns, to a CPU of which the CPU busy rate is the minimum rate, a CPU of which the CPU busy rate is the maximum rate and that is responsible for access to a RAID group and assigned as a responsible CPU to the RAID group. In the selection of an RLU targeted for a change of assignment, when the CM 203 changes the assignment of a CPU responsible for access to the RLU, the CPU 203 calculates a CPU busy rate for each of RLUs and selects the RLU that is targeted for the change of the assignment and for which the calculated CPU busy rate is closest to a half of the certain threshold. After the responsible CPU is changed, the CM 203 determines whether or not a CPU busy rate is concentrated. The CM 203 repeats this operation until the CPU 203 determines that any CPU busy rate is not concentrated.

Figure 13:
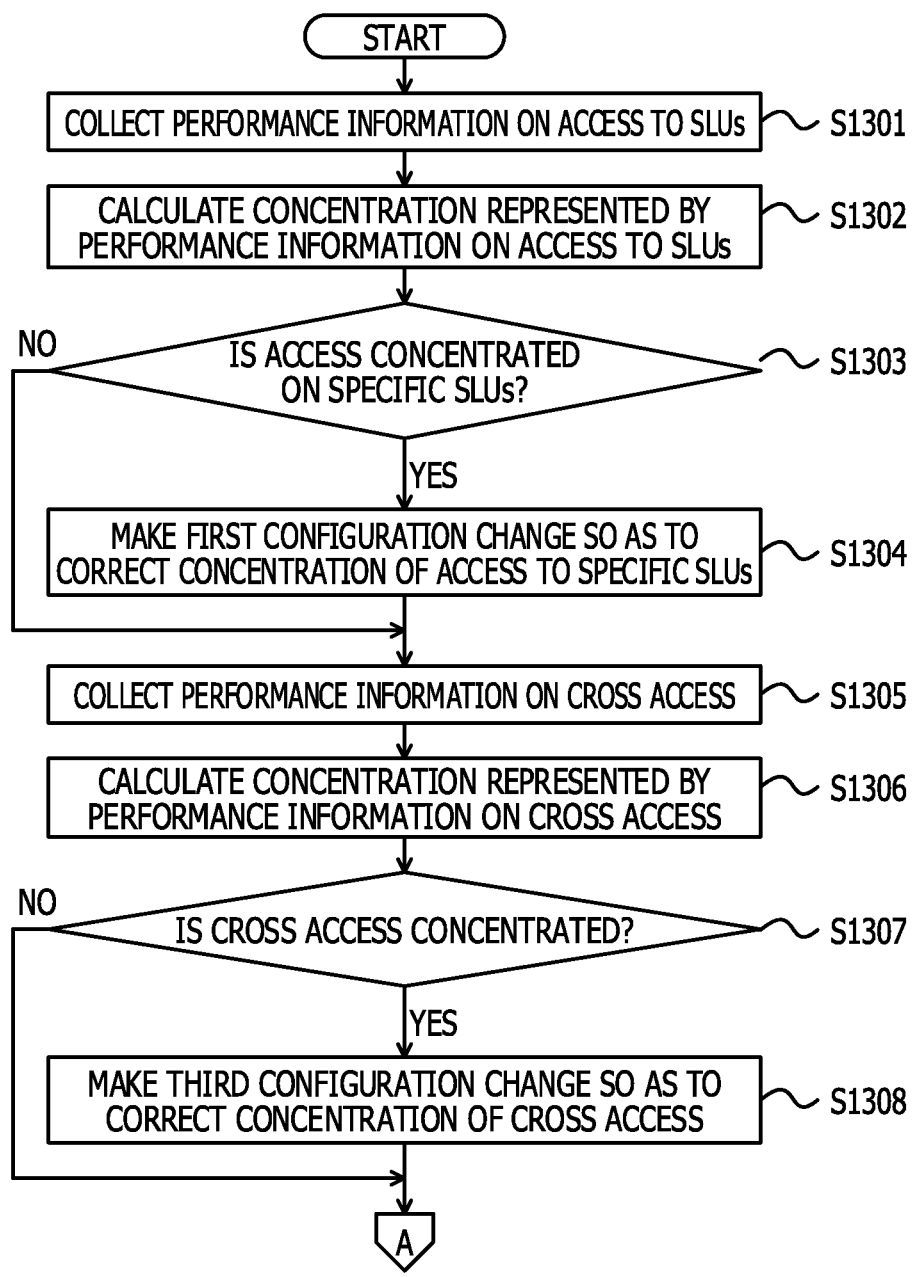
FIG. 13 is a first flowchart of an example of a procedure for a process of detecting and correcting concentration.
Figure 14:
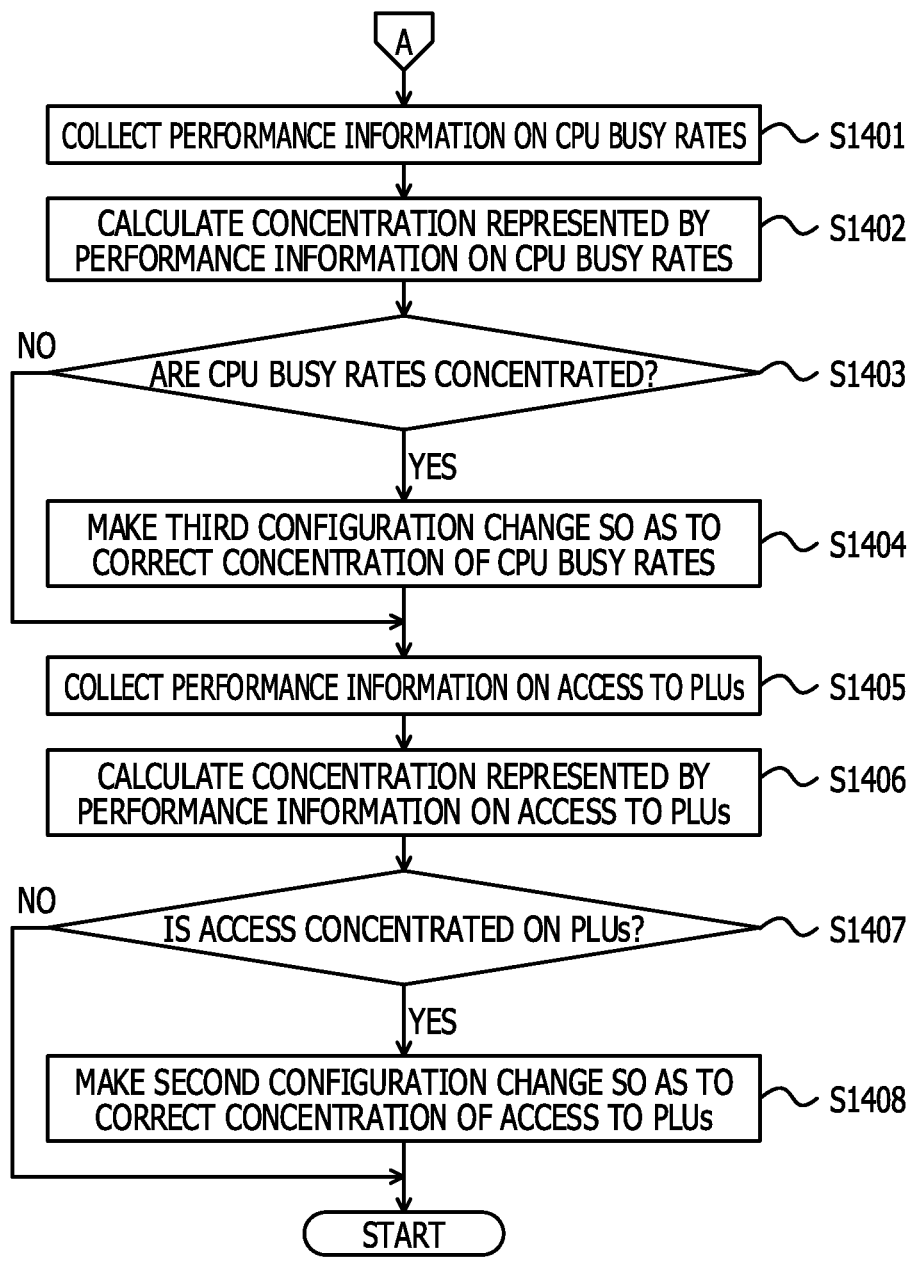
FIG. 14 is a second flowchart of the example of the procedure for the process of detecting and correcting concentration.

FIGS. 13 and 14 are first and second flowcharts of an example of a procedure for a process of detecting and correcting concentration.

FIG. 13 is the first flowchart of the example of the procedure for the process of detecting and correcting concentration, while FIG. 14 is the second flowchart of the example of the procedure for the process of detecting and correcting concentration. The process of detecting and correcting concentration is a process of detecting and correcting the concentration of the four types illustrated in FIG. 9. The process of detecting and correcting concentration may be executed by any of the CMs 203 to 206. This example assumes that the CPU 301#1 of the CPU 203 executes the process of detecting and correcting concentration. In order to simplify the following description, the following describes the fact that the CM 203 executes the process of detecting and correcting concentration.

The CM 203 collects performance information on access to SLUs (in step S1301). The CM 203 calculates concentration represented by the performance information on the access to the SLUs (in step S1302). For example, an example of expressions to be used for the calculation in step S1302 is expressions (9-4-1) to (9-4-6). Subsequently, the CM 203 determines whether or not access is concentrated on specific SLUs (in step S1303). An example of an expression to be used for the determination in step S1303 is any of Inequities (9-4-7) to (9-4-9). If the CM 203 determines that the access is concentrated on the specific SLUs (Yes in step S1303), the CM 203 makes the first configuration change so as to correct the concentration of the access to the specific SLUs (in step S1304).

After the termination of the process of step S1304 or if the CM 203 determines that the access is not concentrated on the specific SLUs (No in step S1303), the CM 203 collects performance information on cross access (in step S1305). Next, the CM 203 calculates concentration represented by the performance information on the cross access (in step S1306). An example of expressions to be used for the calculation in step S1306 is expressions (9-3-1) and (9-3-2). Subsequently, the CM 203 determines whether or not cross access is concentrated (in step S1307). An example of an expression to be used for the determination in step S1307 is expression (9-3-3). If the CM 203 determines that the cross access is concentrated (Yes in step S1307), the CM 203 makes the third configuration change so as to correct the concentration of the cross access (in step S1308).

After the termination of the process of step S1308 or if the CM 203 determines that the cross access is not concentrated (No in step S1307), the CM 203 collects performance information on CPU busy rates (in step S1401). Next, the CM 203 calculates concentration represented by the performance information on the CPU busy rates (in step S1402). An example of an expression to be used for the calculation in step S1402 is expression (9-2-1). Subsequently, the CM 203 determines whether or not CPU busy rates are concentrated (in step S1403). An example of an expression to be used for the determination in step S1403 is expression (9-2-2). If the CM 203 determines that the CPU busy rates are concentrated (Yes in step S1403), the CM 203 makes the third configuration change so as to correct the concentration of the CPU busy rates (in step S1404).

After the termination of the process of step S1404 or if the CM 203 determines that the CPU busy rates are not concentrated (No in step S1403), the CM 203 collects performance information on access to PLUs (in step S1405). Next, the CM 203 calculates concentration represented by the performance information on the access to the PLUs (in step S1406). An example of expressions to be used for the calculation in step S1406 is expressions (9-1-1) to (9-1-4). Subsequently, the CM 203 determines whether or not access is concentrated on PLUs (in step S1407). An example of an expression to be used for the determination in step S1407 is any of expressions (9-1-5) and (9-1-6). If the CM 203 determines that the access is concentrated on the PLUs (Yes in step S1407), the CM 203 makes the second configuration change so as to correct the concentration of the access to the PLUs (in step S1408). After the termination of the process of step S1408 or if the CM 203 determines that the access is not concentrated on the PLUs (No in step S1407), the CM 203 terminates the process of detecting and correcting concentration.

By executing the process of detecting and correcting concentration, the storage system 200 may suppress a delay of a response to access from the host device 201. In each of the correction of the concentration of cross access and the correction of the concentration of CPU busy rates, a CPU that is responsible for access to a RAID group is changed, and PLUs and SLUs that are destinations of access are not changed. Thus, the correction of the concentration of cross access and the correction of the concentration of CPU busy rates do not affect the concentration of access to PLUs. Thus, the CM 203 may execute the processes of steps S1405 to S1408 after the termination of the process of step S1304 or after the CM 203 determines that the access is not concentrated on the specific SLUs (No in step S1303).

As described above, after correcting the concentration of access to each SLU of a PLU, the CM 203 corrects the concentration of access to the PLU or the concentration of a load on a CPU. Thus, the CM 203 inhibits the accuracy of correction causing a high effect on the performance of the storage system 100 from being reduced by correction causing a low effect on the performance of the storage system 100.

If the CM 203 detects that access is concentrated on a plurality of storage sections, the CM 203 may change a RAID level of a RAID group or the number of storage sections in the second configuration change in response to the detection after the first configuration change. Thus, since the storage system 200 makes the second configuration change causing a high effect on the performance of the storage system 200 after the first configuration change causing a low effect on the performance of the storage system 200, the improvement of the performance is not inhibited due to the second configuration change. Thus, the configuration changes may be efficiently made. In addition, by changing a RAID level of a RAID group or the number of storage sections, the storage system 200 may distribute a load of access and suppress a delay in the performance.

If the CM 203 detects that cross access is concentrated or a load is concentrated on CPUs, the CM 203 may make the third configuration change after the first configuration change in response to the detection. Thus, since the storage system 200 makes the third configuration change causing a high effect on the performance of the storage system 200 after the first configuration change causing a low effect on the performance of the storage system 200, the improvement of the performance of the storage system 200 is not inhibited due to the third configuration change, and the performance of the storage system 200 may be efficiently improved.

If the CM 203 detects that access is concentrated on specific SLUs, the CM 203 may make the second or third configuration change after changing a RAID level of a RAID group or the number of storage sections in the first configuration change. By changing the RAID level of the RAID group or the number of storage sections, the storage system 200 may distribute a load of access and suppress a delay in the performance.

The storage system 200 analyzes internal performance information, promotes the optimization of settings or a recommended configuration and the addition of a resource, and may inhibit a response from being delayed due to a characteristic of access from the host device 201. In addition, by automatically optimizing a device configuration, the performance of the storage system 200 may be estimated to be improved. The administrator of the storage system 200 may enable sufficient performance of storage sections without considering detailed settings of the storage sections from the configuration of the system and reduce a load caused by management.

The control method described in the embodiment may be achieved by a computer such as a personal computer or a workstation to execute a prepared program. The program for the storage control devices is stored in a computer-readable storage medium such as a hard disk, a flexible disk, a CD-ROM, a magneto-optical disc, or a DVD, read by the computer from the storage medium, and executed by the computer. The program for the storage control devices may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device that is any of a plurality of storage control devices configured to control access to a plurality of storages included in a storage system, comprising:
   a processor; and
   a memory which stores a plurality of instructions, which when executed by the processor, cause the processor to execute:
      detecting whether there is a first deviation of accessing among a plurality of storage regions included in the plurality of storages,
      when the first deviation is detected, executing, depending on the first deviation, a first configuration change so as to reduce the first deviation based on configuration information identifying a configuration of the storage system; and
      after the executing of the first configuration change, detecting whether there is a second deviation of accessing among the plurality of storages, and when the second deviation is detected, executing, depending on the second deviation, a second configuration change so as to reduce the second deviation based on the configuration information, or
      after the executing of the first configuration change, detecting whether there is a third deviation of load among the plurality of storage control devices, and when the third deviation is detected, executing, depending on the third deviation, a third configuration change so as to reduce the third deviation based on the configuration information.

2. The device according to claim 1,
wherein the second configuration change includes:
a process of changing a RAID level of a RAID group including a storage section relatively frequently accessed among the plurality of storages based on the configuration information in response to the detection of the second deviation of the access to the plurality of storages or a process of changing the number of storages included in the RAID group based on the configuration information in response to the detection of the second deviation of the access to the plurality of storages.

3. The device according to claim 1,
wherein the third configuration change includes:
a process of changing the assignment of a relatively high load storage control device to a RAID group among storage control devices that are responsible for access to a plurality of RAID groups formed of the plurality of storages, respectively, based on the configuration information in response to the detection of the third deviation of the load on the plurality of storage control devices.

4. The device according to claim 1,
wherein the first configuration change includes:
a process of changing a RAID level of a RAID group including a storage region relatively frequently accessed among the plurality of storage regions, based on the configuration information in response to the detection of the first deviation of the access to the plurality of storage regions or a process of changing the number of storages included in the RAID group in response to the detection of the concentration of the access to the plurality of storage regions.

5. The device according to claim 1,
wherein the first deviation is based on a difference between the number of a previous times access and a current times access for the plurality of storage regions;
wherein the second deviation is based on a difference between the number of a previous times access and a current times access for the plurality of storages;
wherein the third deviation is based on a difference between the number of a previous times load and a current times load for the plurality of storage control devices.

6. A control method to be executed by any of a plurality of storage control devices configured to control access to a plurality of storages included in a storage system, comprising:
detecting whether there is a first deviation of accessing among a plurality of storage regions included in the plurality of storages;
when the first deviation is detected, executing, by a computer processor, depending on the first deviation, a first configuration change so as to reduce the first deviation based on configuration information identifying a configuration of the storage system; and
after the executing of the first configuration change detecting whether there is a second deviation of accessing among the plurality of storages; and
when the second deviation is detected, executing, depending on the second deviation, a second configuration change so as to reduce the second deviation based on the configuration information, or
after the executing of the first configuration change, detecting whether there is a third deviation of load among the plurality of storage control devices; and when the third deviation is detected, executing, depending on the third deviation, a third configuration change so as to reduce the third deviation based on the configuration information.

7. The method according to claim 6,
wherein the second configuration change includes:
a process of changing a RAID level of a RAID group including a storage section relatively frequently accessed among the plurality of storages based on the configuration information in response to the detection of the second deviation of the access to the plurality of storages or a process of changing the number of storages included in the RAID group based on the configuration information in response to the detection of the second deviation of the access to the plurality of storages.

8. The method according to claim 6,
wherein the third configuration change includes:
a process of changing the assignment of a relatively high load storage control device to a RAID group among storage control devices that are responsible for access to a plurality of RAID groups formed of the plurality of storages, respectively, based on the configuration information in response to the detection of the third deviation of the load on the plurality of storage control devices.

9. The method according to claim 6,
wherein the first configuration change includes:
a process of changing a RAID level of a RAID group including a storage region relatively frequently accessed among the plurality of storage regions, based on the configuration information in response to the detection of the first deviation of the access to the plurality of storage regions or a process of changing the number of storages included in the RAID group in response to the detection of the concentration of the access to the plurality of storage regions.

10. The method according to claim 6,
wherein the first deviation is based on a difference between the number of a previous times access and a current times access for the plurality of storage regions;
wherein the second deviation is based on a difference between the number of a previous times access and a current times access for the plurality of storages;
wherein the third deviation is based on a difference between the number of a previous times load and a current times load for the plurality of storage control devices.

11. A computer-readable storage non-transitory medium storing a storage control device program that causes any of a plurality of storage control devices configured to control access to a plurality of storages included in a storage system to execute a process comprising:
detecting whether there is a first deviation of accessing among a plurality of storage regions included in the plurality of storages;
when the first deviation is detected, executing, depending on the first deviation, a first configuration change so as to reduce the first deviation based on configuration information identifying a configuration of the storage system; and
after the executing of the first configuration change, detecting whether there is a second deviation of accessing among the plurality of storages; and
when the second deviation is detected, executing, depending on the second deviation, a second configuration change so as to reduce the second deviation based on the configuration information, or after the executing of the first configuration change, detecting whether there is a third deviation of load among the plurality of storage control devices; and when the third deviation is detected, executing, depending on the third deviation, a third configuration change so as to reduce the third deviation based on the configuration information.

12. The computer-readable storage non-transitory medium according to claim 11, wherein the second configuration change includes:

a process of changing a RAID level of a RAID group including a storage section relatively frequently accessed among the plurality of storages based on the configuration information in response to the detection of the second deviation of the access to the plurality of storages or a process of changing the number of storages included in the RAID group based on the configuration information in response to the detection of the second deviation of the access to the plurality of storages.

13. The computer-readable storage non-transitory medium according to claim 11, wherein the third configuration change includes:

a process of changing the assignment of a relatively high load storage control device to a RAID group among storage control devices that are responsible for access to a plurality of RAID groups formed of the plurality of storages, respectively, based on the configuration information in response to the detection of the third deviation of the load on the plurality of storage control devices.

14. The computer-readable storage non-transitory medium according to claim 11, wherein the first configuration change includes:

a process of changing a RAID level of a RAID group including a storage region relatively frequently accessed among the plurality of storage regions, based on the configuration information in response to the detection of the first deviation of the access to the plurality of storage regions or a process of changing the number of storages included in the RAID group in response to the detection of the concentration of the access to the plurality of storage regions.

15. The computer-readable storage non-transitory medium according to claim 11, wherein the first access deviation is based on a difference between the number of a previous times access and a current times access for the plurality of storage regions;

wherein the second access deviation is based on a difference between the number of a previous times access and a current times access for the plurality of storages;

wherein the third access deviation is based on a difference between the number of a previous times load and a current times load for the plurality of storage control devices.

* * * * *